(12) United States Patent
Kunishige et al.

(10) Patent No.: US 10,354,691 B2
(45) Date of Patent: Jul. 16, 2019

(54) PHOTOGRAPHING DEVICE, PHOTOGRAPHING METHOD, AND PLAYBACK METHOD

(71) Applicant: Olympus Corporation, Hachioji-shi, Tokyo (JP)

(72) Inventors: Keiji Kunishige, Hachioji (JP); Satoshi Miyazaki, Tokyo (JP); Masaomi Tomizawa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 226 days.

(21) Appl. No.: 15/220,907

(22) Filed: Jul. 27, 2016

(65) Prior Publication Data

US 2017/0025150 A1    Jan. 26, 2017

Related U.S. Application Data

(62) Division of application No. 14/192,203, filed on Feb. 27, 2014, now Pat. No. 9,467,621, which is a division
(Continued)

(30) Foreign Application Priority Data

Jun. 15, 2009  (JP) ................ 2009-141902
Jun. 15, 2009  (JP) ................ 2009-141903
Jun. 15, 2009  (JP) ................ 2009-141904

(51) Int. Cl.
*G11B 27/00*  (2006.01)
*G06K 9/00*   (2006.01)
(Continued)

(52) U.S. Cl.
CPC ........ *G11B 27/005* (2013.01); *G06K 9/00228* (2013.01); *G06K 9/00288* (2013.01);
(Continued)

(58) Field of Classification Search
CPC ................................................ H04N 5/23245
See application file for complete search history.

(56) References Cited

U.S. PATENT DOCUMENTS

2003/0193578 A1*  10/2003  Parulski ............. H04N 5/765
                                                          348/220.1
2007/0279498 A1   12/2007  Nonaka
(Continued)

FOREIGN PATENT DOCUMENTS

JP  2005-140851   6/2005
JP  2006-254272   9/2006
JP  2008-311886   12/2008

OTHER PUBLICATIONS

Office Action to corresponding Japanese Patent Application No. 2016-082740, dated Feb. 14, 2017 (3 pgs.)
(Continued)

*Primary Examiner* — Christopher K Peterson
(74) *Attorney, Agent, or Firm* — John C. Pokotylo; Pokotylo Patent Services

(57) ABSTRACT

A photographing device according to the present invention comprises: an imaging section that captures a subject image and outputs image data; a motion picture recording section that records a motion picture based on the image data; a parameter setting section that sets a photographing parameter to change a photographing state; and a parameter control section that automatically changes the photographing parameter during the recording of the motion picture regardless of the set photographing parameter.

20 Claims, 28 Drawing Sheets

Related U.S. Application Data of application No. 12/815,082, filed on Jun. 14, 2010, now Pat. No. 8,743,269.

(51) Int. Cl.

| | |
|---|---|
| G06T 3/00 | (2006.01) |
| G06T 11/60 | (2006.01) |
| H04N 1/21 | (2006.01) |
| G11B 27/10 | (2006.01) |
| G11B 27/02 | (2006.01) |
| H04N 5/76 | (2006.01) |
| H04N 5/232 | (2006.01) |
| H04N 9/82 | (2006.01) |
| H04N 5/77 | (2006.01) |
| H04N 9/00 | (2006.01) |
| H04N 5/83 | (2006.01) |
| H04N 9/804 | (2006.01) |
| H04N 9/79 | (2006.01) |
| H04N 5/783 | (2006.01) |
| H04N 101/00 | (2006.01) |

(52) U.S. Cl.
CPC ...... *G06K 9/00302* (2013.01); *G06K 9/00711* (2013.01); *G06T 3/0093* (2013.01); *G06T 11/60* (2013.01); *G11B 27/02* (2013.01); *G11B 27/10* (2013.01); *H04N 1/212* (2013.01); *H04N 1/215* (2013.01); *H04N 5/232* (2013.01); *H04N 5/23219* (2013.01); *H04N 5/23245* (2013.01); *H04N 5/23293* (2013.01); *H04N 5/76* (2013.01); *H04N 5/772* (2013.01); *H04N 9/7921* (2013.01); *H04N 9/8205* (2013.01); *G06T 2207/30201* (2013.01); *H04N 5/783* (2013.01); *H04N 9/8042* (2013.01); *H04N 9/8047* (2013.01); *H04N 2101/00* (2013.01)

(56) References Cited

U.S. PATENT DOCUMENTS

| | | |
|---|---|---|
| 2009/0028539 A1 | 1/2009 | Nakahara |
| 2009/0064039 A1* | 3/2009 | Lee ................ G06F 3/0482 715/810 |

OTHER PUBLICATIONS

Office Action to corresponding Japanese Patent Application No. 2016-082740, dated Aug. 16, 2017 (4 pgs.)

* cited by examiner

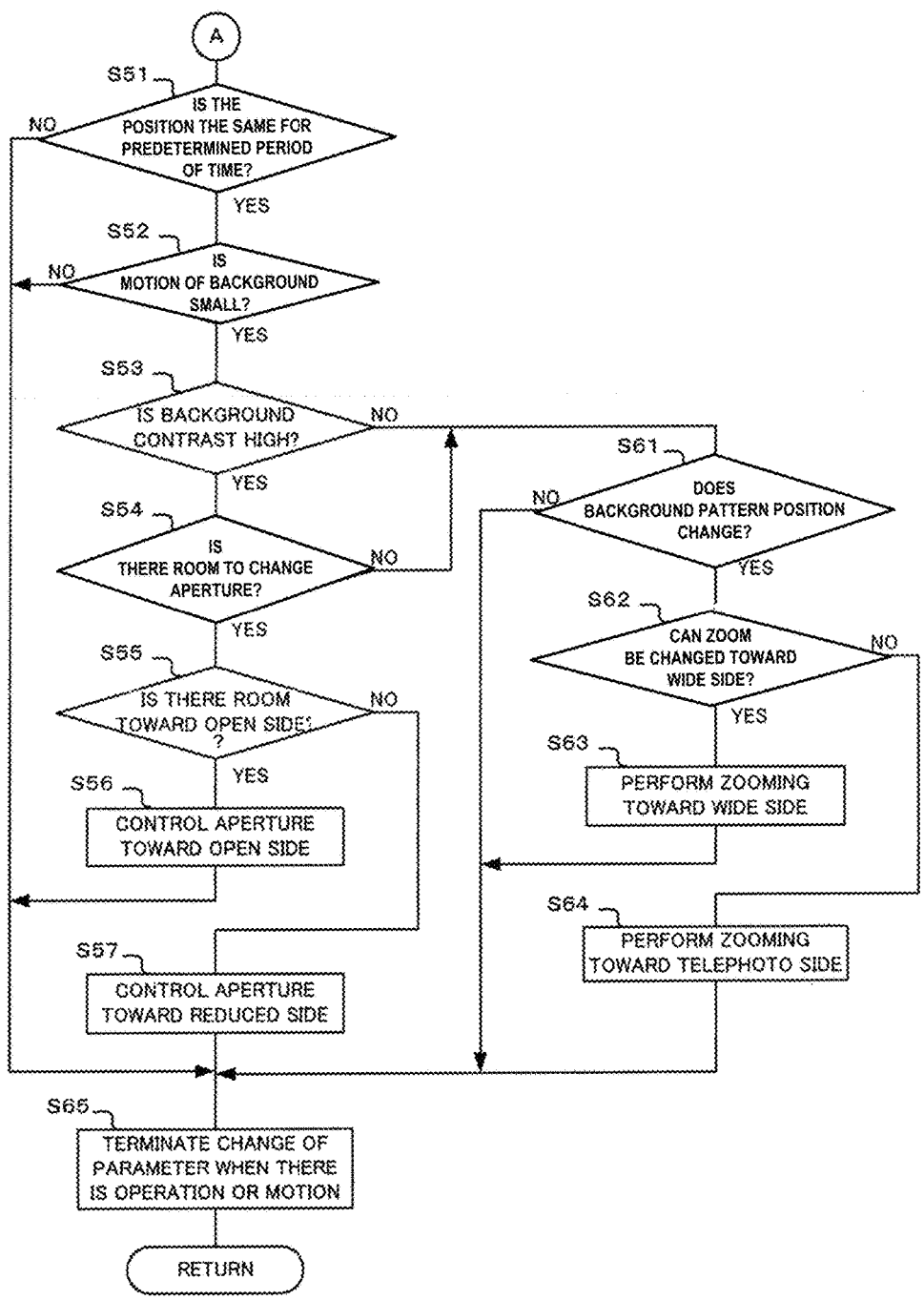

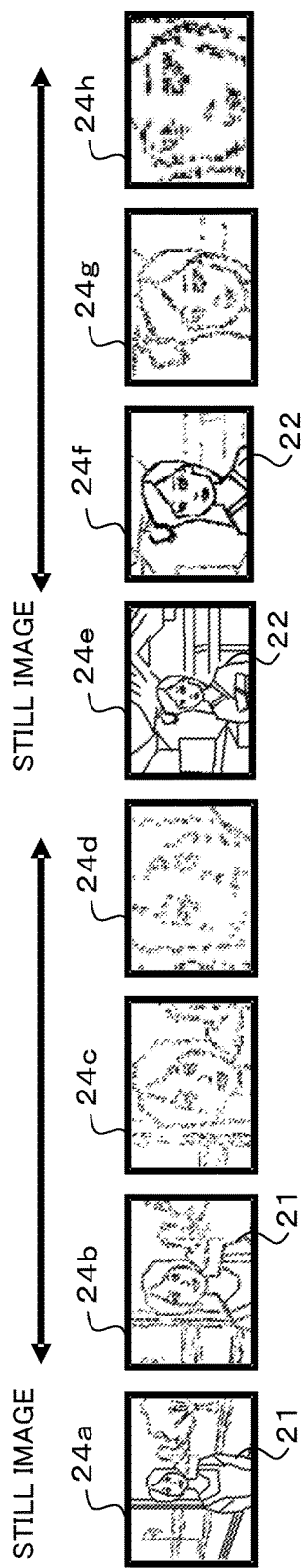
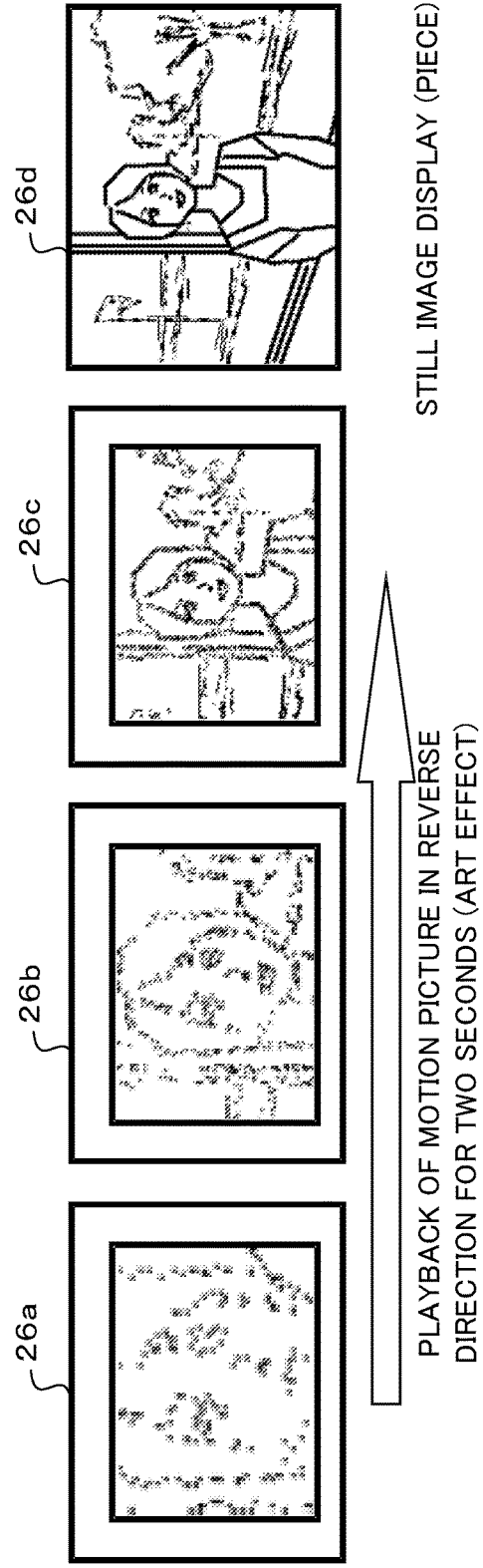
FIG. 15
FIG. 16

FIG. 28

| CONDITIONS | WEIGHTING OF Za | WEIGHTING OF Zb | |
|---|---|---|---|
| | | IMAGE WITHOUT FACE | IMAGE WITH FACE |
| (1) FACE WITH THE UPPER HALF OF THE BODY | 10 | | 10 |
| (2) FACE WITH THE WHOLE BODY | 5 | | 5 |
| (3) THERE IS A MOTION | 5 | 5 | 5 |
| (4) THERE IS A CHANGE IN COLOR | 5 | 5 | 5 |
| (5) REGION AREA IS 1/2 OR MORE | 2 | 2 | 2 |
| (6) REGION AREA IS 1/3 OR MORE | 5 | 5 | 5 |
| (7) BRIGHTER THAN Za PART | 7 | | |
| (8) SCREEN CENTER PART | | 5 | 5 |
| (9) CONTRAST IS HIGHER THAN FACE PART | | | 2 |
| (10) FOCUS IS DISTANT FROM FOCUS POSITION | | 7 | 7 |

PHOTOGRAPHING DEVICE, PHOTOGRAPHING METHOD, AND PLAYBACK METHOD

This application is a divisional application of U.S. patent application Ser. No. 14/192,203 (referred to as "the '203 application" and incorporated herein by reference), filed on Feb. 27, 2014, titled "PHOTOGRAPHING DEVICE, PHOTOGRAPHING METHOD, AND PLAYBACK METHOD," and listing Keiji KUNISHIGE, Satoshi MIYAZAKI, Masaomi TOMIZAWA, and Osamu NONAKA as inventors, the '203 application being a divisional application of U.S. patent application Ser. No. 12/815,082 (referred to as "the '082 application" and incorporated herein by reference), filed on Jun. 14, 2010, titled "PHOTOGRAPHING DEVICE, PHOTOGRAPHING METHOD, AND PLAYBACK METHOD," listing Keiji KUNISHIGE, Satoshi MIYAZAKI, Masaomi TOMIZAWA, and Osamu NONAKA as inventors, and issuing as U.S. Pat. No. 8,743,269 on Jun. 3, 2014, the '082 application claiming benefit, under 35 U.S.C. § 119, to the filing date of prior Japanese Patent Applications Nos. 2009-141902, 2009-141903, 2009-141904 filed on Jun. 15, 2009. These applications are expressly incorporated herein by reference. The scope of the present invention is not limited to any requirements of the specific embodiments described in the applications.

BACKGROUND OF THE INVENTION

Field of the Invention

The present invention relates to a photographing device, such as a digital camera, a video camera, and a mobile telephone with camera, and in detail, to a photographing device having a function of capturing a still image and motion picture, a photographing method, and a playback method.

Description of the Related Art

When photographing is performed, photographing parameters, such as an aperture and zoom position, are switched generally. This method is effective when capturing a still image while switching photographing parameters before photographing in a trial-and-error manner to confirm its effect.

On the other hand, when capturing a motion picture, if photographing parameters are switched during photographing in order to introduce variation in a monotonous screen, camera shake will occur during the operation. Further, the entire process of the trial-and-error operation to switch photographing parameters is photographed. Hence, a general user is reluctant to switch photographing parameters during the photographing of a motion picture. As a result, a monotonous motion picture lacking interest is obtained.

Further, when capturing a motion picture, it is difficult to know when to start and stop photographing, and only a motion picture of an athletic meeting or wedding ceremony, which is a formalized event, is captured with a movie camera. Capturing a motion picture in such a case is likely to result in a monotonous motion picture lacking interest, with a similar composition and exposure.

As described above, when capturing a motion picture, it is likely that only a monotonous motion picture lacking interest is obtained, and there have been made various proposals to solve such a problem. For example, Japanese Unexamined Patent Publication No. 2003-110995 (disclosed on Apr. 11, 2003) discloses an image processing device capable of sequentially connecting a plurality of intervals specified by a user and imparting a transition effect at a connected part. According to this image processing device, it is possible to easily perform a high-level edition of a motion picture desired by a user without the need to be aware of expertise.

Further, Japanese Patent No. 4240108 (disclosed on May 15, 2008) discloses an image sensor capable of detecting a change in facial expression and of photographing at a timing intended by a user. According to this image sensor, it is possible to prevent the timing of photographing from being delayed and to ensure recording of a facial expression desired by a user.

Furthermore, a movie camera capable of capturing a still image while capturing a motion picture is disclosed in the following prior art. Japanese Unexamined Patent Publication No. 4-331583 (disclosed on Nov. 19, 1992) discloses that a strobe zoom mechanism is not used at the time of strobe flash when capturing a still image while capturing a motion picture but an image signal is amplified in an AGC circuit in accordance with information about distance. Further, Japanese Patent No. 3673528 (disclosed on Mar. 10, 1995) discloses a camera capable of easily selecting the priority of still image photographing or the priority of motion picture photographing by providing a motion picture photographing switch and a still image photographing switch.

SUMMARY OF THE INVENTION

An object of the present invention is to provide a photographing device capable of capturing and playing back a varied moving image, a photographing method, and a playback method.

The photographing device according to the present invention comprises: an imaging section that captures a subject image and outputs image data; a motion picture recording section that records a motion picture based on the image data; a parameter setting section that sets a photographing parameter to change a photographing state; and a parameter control section that automatically changes the photographing parameter during the recording of the motion picture regardless of the set photographing parameter.

The photographing device according to the present invention comprises: an imaging section that captures a subject image and outputs image data; a motion picture recording section that records a motion picture based on the image data; a parameter setting section that sets a photographing parameter to change a photographing state; a composition change determining section that determines a change in composition in a photographing screen; and a parameter control section that changes the photographing parameter during the recording of the motion picture regardless of the set photographing parameter when the composition change determining section determines that the composition is stable.

The photographing device according to the present invention comprises an imaging section that captures a subject image and outputs image data; a motion picture recording section that records a motion picture based on the image data; a parameter setting section that manually sets a photographing parameter to change a photographing state; a facial expression determining section that determines a change in facial expression of a subject based on the image data; and a parameter control section that changes the photographing parameter during the recording of the motion picture regardless of the manually set photographing parameter in accordance with change in facial expression determined by the determining section.

The photographing method according to the present invention comprises the steps of: capturing a subject image and outputting image data; recording the image data; and changing the photographing parameter during the recording of the motion picture based on the image data regardless of the manually set photographing parameter to change a photographing state.

The photographing device according to the present invention comprises: an imaging section that captures a subject image and outputs image data; a parameter control section that controls a photographing parameter to change a photographing state when acquiring the image data; a release section to instruct to capture a still image; and a photographing control section that acquires the image data in accordance with the instruction to capture a still image and subsequently, while changing the photographing parameter by the parameter control section, acquires and records the image data of continuous shooting.

The photographing device according to the present invention comprises: a screen dividing section that divides a photographing screen into a plurality of regions in accordance with information about focus adjustment; a focus adjustment determining section that assigns a weight determined for each divided region in accordance with a screen feature in the photographing screen divided by the screen dividing section and determines an order of focus adjustment, from which divided region to which divided region the focus should be adjusted, in the screen in accordance with the result of the weighting; and a focus control section that drives a photographic lens in accordance with the order of focus adjustment determined by the focus adjustment determining section.

The playback method according to the present invention comprises the steps of: storing a still image and image data of continuous shooting following the still image; rearranging the stored image data in a direction opposite to the direction of the points of time of continuous shooting; and successively playing back and displaying the still image and the images of the continuous shooting rearranged by an image processing section.

The recording medium that supplies a computer-readable program for causing a computer to execute processing according to the present invention causes a computer to execute processing comprising the steps of: storing a still image and image data of continuous shooting following the still image; rearranging the stored image data in a direction opposite to the direction of points of time of the continuous shooting; and successively playing back and displaying the still image and the images of the continuous shooting rearranged by an image processing section.

BRIEF DESCRIPTION OF THE DRAWINGS

FIG. 6 is a flowchart showing the operation of parameter automatic control of the camera in the first embodiment of the present invention.

FIG. 15 is a diagram showing the way to play back a still image and a motion picture continuously captured with the camera according to the fourth embodiment of the present invention.

FIG. 16 is a diagram showing the way to play back a still image and a motion picture continuously captured in the reverse direction with the camera according to the fourth embodiment of the present invention.

FIG. 28 is a diagram showing a relationship of weighting to determine a Za region and a Zb region for performing a focus shift with the camera according to the fifth embodiment of the present invention.

DESCRIPTION OF THE PREFERRED EMBODIMENTS

Figure 1:
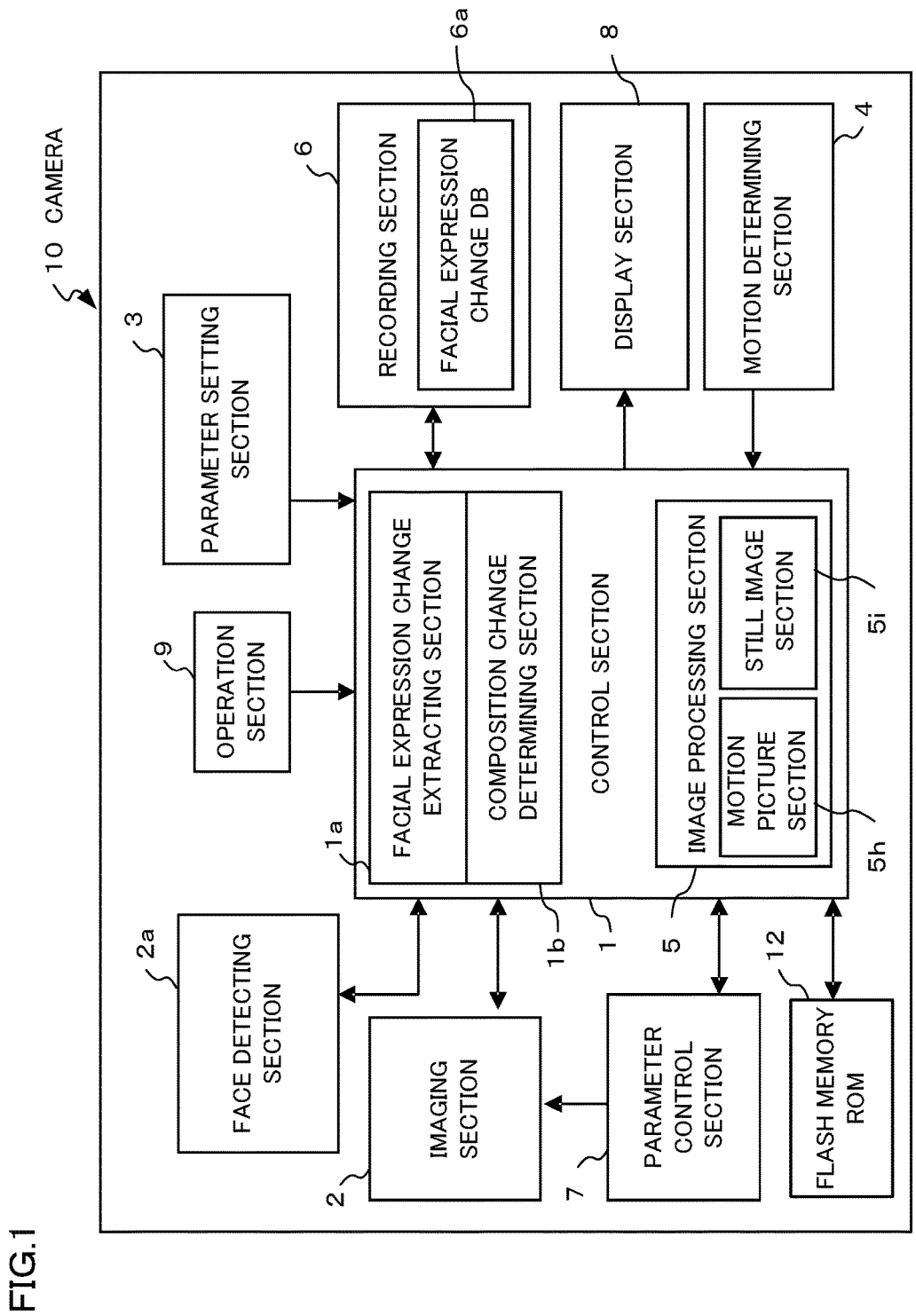
FIG. 1 is a block diagram showing an electrical configuration of a camera according to a first embodiment of the present invention.

Hereinafter, preferred embodiments will be described in accordance with the drawings using a camera to which the present invention has been applied. FIG. 1 is a block diagram showing an electric circuit of a camera 10 according to a first embodiment of the present invention. The camera 10 is a digital camera and includes a control section 1, an imaging section 2, a face detecting section 2a, a parameter setting section 3, a motion determining section 4, a recording section 6, a parameter control section 7, a display section 8, an operation section 9, a flash ROM 12, etc.

The imaging section 2 includes a photographic lens (zoom lens) having a zoom function, an exposure control section, such as a shutter and aperture, an image sensor, a drive and read circuit of the image sensor, etc., and converts a subject image formed by the photographic lens into image data by the image sensor and outputs the data.

The face detecting section 2a detects whether or not a person's face is included in the subject image based on the image data output from the imaging section 2 and processed by an image processing section 5 within the control section 1, and when a face is included, detects the position, size, etc., thereof and outputs the detection result to the control section 1. The detection of a face is performed by extracting the shade of parts, such as an eye, nose, and mouth, in a face and using a pattern matching method etc.

The control section 1 controls the total sequence of the camera 10 in accordance with programs stored in the flash ROM 12. The control section 1 has a facial expression change extracting section 1a, a composition change determining section 1b, and the image processing section 5. The facial expression change extracting section 1a extracts a change in facial expression based on the image data output from the imaging section 2, the detection result of a face output from the face detecting section 2a, and the pattern of parts of a face, such as an eye, nose, and mouth, and data about the change in a facial expression stored in a facial expression change database (DB) 6a, to be described later.

The composition change determining section 1b determines whether or not the composition of the screen and the way to hold the camera 10 change. When determining a change in the composition of the screen, the composition change determining section 1b makes use of a motion vector etc. that is obtained based on the image data output from the imaging section 2. The way to hold the camera 10 is determined based on a determination output of the motion determining section 4, to be described later.

The image processing section 5 has a motion picture section 5h and a still image section 5i, takes in image data output from the imaging section 2, performs various kinds of image processing, such as thinning processing, trimming processing, edge enhancement, color correction, and image compression, and performs image processing for displaying a live view of a motion picture, for recording a still image and a motion picture in the recording section 6, for playing back and displaying a still image and a motion picture, etc. The image processing section 5 has a circuit for still image and a circuit for motion picture in accordance with processing, such as a still image compression/decompression circuit, a motion picture compression/decompression circuit, etc., for compressing/decompressing images. Further, the image processing section 5 extracts a high-frequency component of image data and determines a contrast of a subject. Information about this contrast is used for adjusting focus of a photographic lens and also used for making a determination at the time of automatic parameter control, to be described later.

The parameter setting section 3 manually sets photographing parameters and outputs the parameters to the control section 1 using a zoom button to change the focal length in the imaging section 2, an aperture value setting operation section for setting an aperture value, etc. It may also be possible to automatically set an aperture value etc. in accordance with the result of exposure control.

The parameter control section 7 controls the imaging section 2 based on the photographing parameters manually set or automatically set in the parameter setting section 3. By controlling the photographing parameters, it becomes possible to adjust the angle of view, blurred background (depth of field), etc. By changing these parameters, it is possible to apply various effects to enjoy photographing. Further, the parameter control section 7 detects the currently set values, such as the aperture value and focal length, and output the values to the control section 1.

The motion determining section 4 has a hexaxial sensor etc. that detects physical quantities in six axes in total: an acceleration in the three-dimensional space, that is, a triaxial acceleration; and a rotation speed in the three-dimensional space, that is, a triaxial angular speed. It is also possible for the motion determining section 4 to determine whether or not the way to hold the camera 10 has changed. It is possible to determine that the way to hold the camera 10 of a photographer has not changed even when the image changes due to zooming etc., and it can be known whether or not the photographer aims at the same subject without changing the way to hold the camera without erroneous operations.

The operation section 9 includes various operation members, such as a still image release button, a motion picture button, a power switch, a playback mode setting button, a menu button, and an automatic mode setting button, and determines the operation state of these operation members and sends the determination result to the control section 1. The control section 1 described above controls photographing and playback in a predetermined sequence in accordance with the operation state of the operation member.

Pressing the still image release button instructs to capture a still image and the motion picture button instructs to start capturing of a motion picture when pressed for the first time and instructs to end the capturing of a motion picture when pressed again. The automatic mode setting button is an operation member to set the automatic mode in which photographing parameters are switched automatically in accordance with the facial expression of a subject, as will be described later. When a touch panel is provided on the front surface of the display section 8, it may also be possible to set the automatic mode with the touch panel.

When instructed to photograph with the release button, the recording section 6 records the image data of a still image and a motion picture captured by the imaging section 2 and subjected to compression processing by the image processing section 3. The facial expression change database (DB) 6a within the recording section 6 is a database showing a relationship between the shapes, positions, etc., of the parts of a face, such as an eye, nose, and mouth, and the facial expression. Based on the relationship, it is possible for the facial expression change extracting section 1a to represent the facial expression of a person, such as the degree of smile, by a numerical value. The degree of smile is represented by a numerical value based on the shape of the eye and mouth, whether or not teeth are seen, etc. The flash ROM 12 is an electrically rewritable memory and stores control programs to be executed in the control section 1, and data such as adjustment values. A memory other than the flash ROM 12, for example, a mask ROM may be accepted as long as it can store the control programs etc.

The display section 8 has a display section, such as a liquid crystal panel and an organic EL panel, disposed on the backside etc. of the camera 10 and performs a live view display before photographing, normal play back display of a recorded image, display of camera information, etc. It is possible for a photographer to observe the live view display to determine a composition and timing.

Next, the automatic change (automatic mode) of the photographing parameters during the display of a live view and photographing of a motion picture in the present embodiment will be described using FIGS. 2A to 2C and FIGS. 3A to 3C. In the present embodiment, the aperture and focal length are changed based on the facial expression, in particular, the degree of smile of a subject person 21.

Figure 2A:
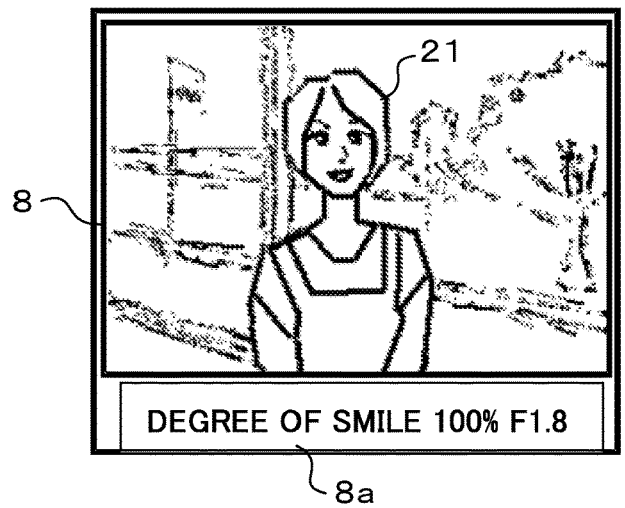
FIGS. 2A to 2C are diagrams for illustrating how to capture a varied moving image by changing the aperture while capturing a motion picture with the camera according to the first embodiment of the present invention.
Figure 2B:
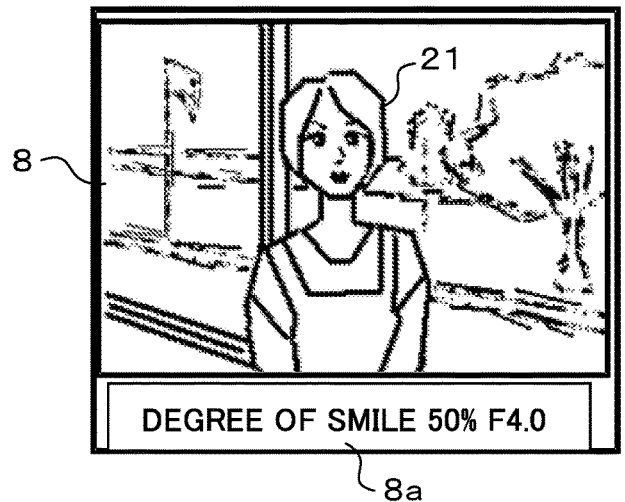
Figure 2C:
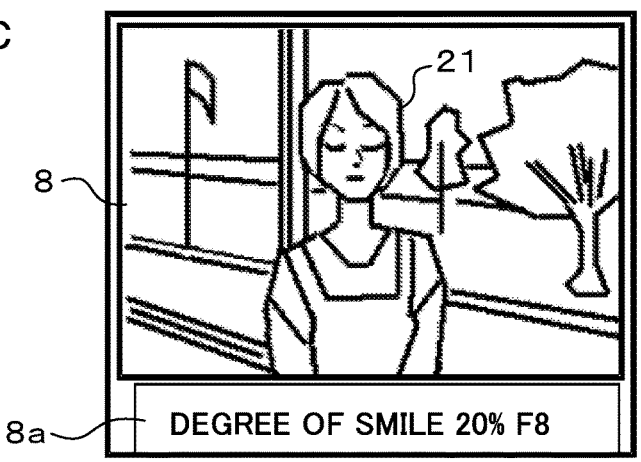

FIGS. 2A to 2C show an example in which the aperture value is switched to another and the depth of field is changed as photographing parameters in accordance with the facial expression, such as the degree of smile. The facial expression, such as the degree of smile, is detected by the facial expression change extracting section 1a and a determination is made by representing the degree of opening of the mouth and eyes, how the teeth are seen, etc., by numerical values. During the display of a live view and photographing of a motion picture, the captured image is displayed on the display section 8, and on a parameter change display section 8a under the captured image the degree of smile and the aperture value at that time are displayed.

FIG. 2A shows a case where the person 21, who is the subject positioned in the center, is smiling with the degree of smile of 100% and in this case, it can be said that the person plays the leading role and the background plays only a supporting role, and therefore, the aperture value is set to F1.8 so that the background is blurred. In FIG. 2B, the degree of smile is 50%, lower than that in FIG. 2A. In this case, the degree of smile is not high, and therefore, the subject person 21 does not desire a photograph in which only the person 21 is outstanding. Hence, the aperture is set to F4.0 and the depth of field is made somewhat deeper.

In FIG. 2C, the subject person 21 closes her eyes and the degree of smile is reduced to 20%, and it can be said that in this scene the subject desires the background to be focused. Hence, the aperture value is set to F8 so that the depth of field is made deeper to make clear the background.

In this manner, in the examples shown in FIGS. 2A to 2C, the facial expression is detected and the camera 10 is controlled to reduce the aperture as the subject plays a less leading role so that the depth of field is made deeper and the attention of a viewer is directed also to the background. Due to such automatic parameter control, it becomes possible to perform photographing in which a viewer can enjoy what kind of image is captured in the background and also enjoy representation that the subject person 21 plays a leading role. In this case, although a photographer does not need to manipulate the aperture each time, a varied photograph can be obtained.

Figure 3A:
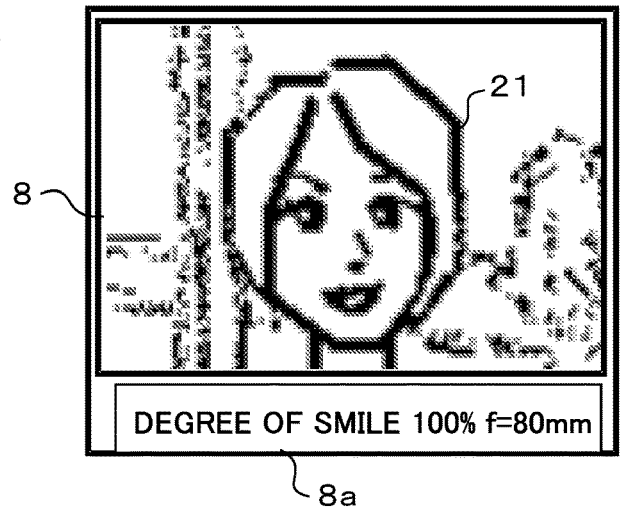
FIGS. 3A to 3C are diagrams for illustrating how to capture a varied moving image by changing the focal length while capturing a motion picture with the camera according to the first embodiment of the present invention.
Figure 3B:
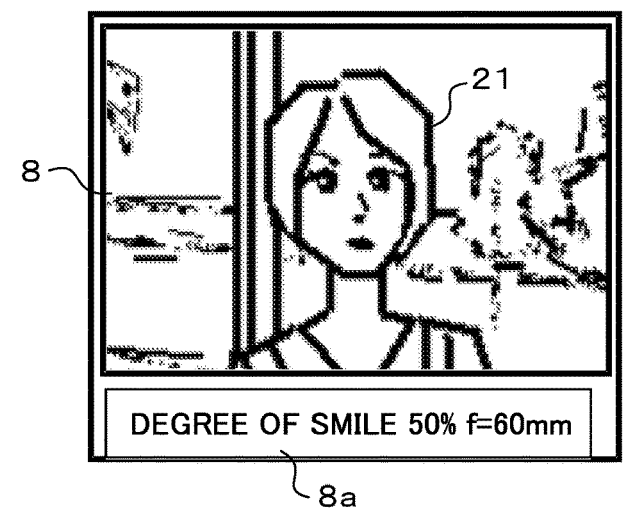
Figure 3C:
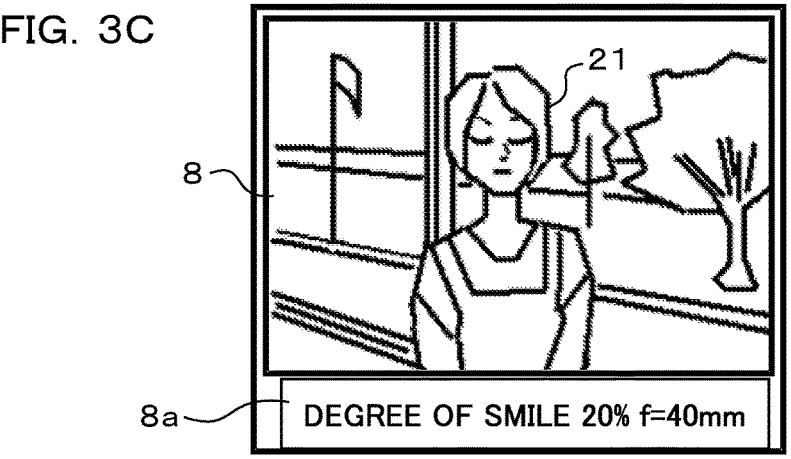

FIGS. 3A to 3C show examples, in which as photographing parameters, the focal lengths are switched and the angle of view is changed in accordance with the degree of smile. FIG. 3A shows a case where the subject person 21 positioned in the center smiles and in this case, the person plays a leading role, and therefore, the face part may be a close-up and the background plays only a supporting role, and therefore, a wide region of the background does not need to be photographed. When the face is closed-up, the zoom lens is moved toward the side of longer focal lengths, and therefore, there is an effect to blur the background. In the example in FIG. 3A, the degree of smile is 100%, and therefore, the focal length is set to 80 mm (equivalent to that of a 35 mm film), the face of the person 21 is closed-up, and the depth of field is made shallower to blur the background.

In FIG. 3B, the degree of smile is 50%, lower than that in FIG. 3A. In this case, the degree of smile is not so high, and therefore, a photograph in which only the subject person 21 is outstanding will not be desired by the person 21. Hence, the focal length is set to 60 mm, that is, the person 21 is photographed in a rather wide angle and the depth of field is made somewhat deeper. In FIG. 3C, the subject person 21 closes her eyes and the degree of smile is reduced to 20%, and therefore, it can be said that in this scene the subject person 21 desires to call a viewer's attention to the background. Hence, the focal length is set to 40 mm, that is, the person 21 is photographed in a wide angle, the depth of field is made deeper, and thus the background is made clear to see.

In this manner, in the examples in FIGS. 3A to 3C, the facial expression is detected and as the person 21 plays a less leading role, the camera 10 is controlled to set the focal length toward the wide side, so that the person 21 is photographed in a wide angle (the person 21 is made smaller relatively), the depth of field is made deeper because the focal length is set toward the wide side, and the background also calls a viewer's attention.

By performing the automatic parameter control in this manner, in the examples shown in FIGS. 3A to 3C also, it becomes possible to perform photographing in which a viewer can enjoy what kind of image is captured in the background and also enjoy representation that the subject person 21 plays a leading role. In this case, although a photographer does not need to operate the zooming operation member each time, a varied photograph can be obtained.

When the angle of view changes due to zooming, the composition change section 1b detects change in composition. When the change in composition is detected, if the motion determining section 4 determines that the way to hold the camera 10 does not change and the direction of the same person 21 is photographed, it is recommended to perform the automatic parameter control on the assumption that the composition is stable.

Figure 4:
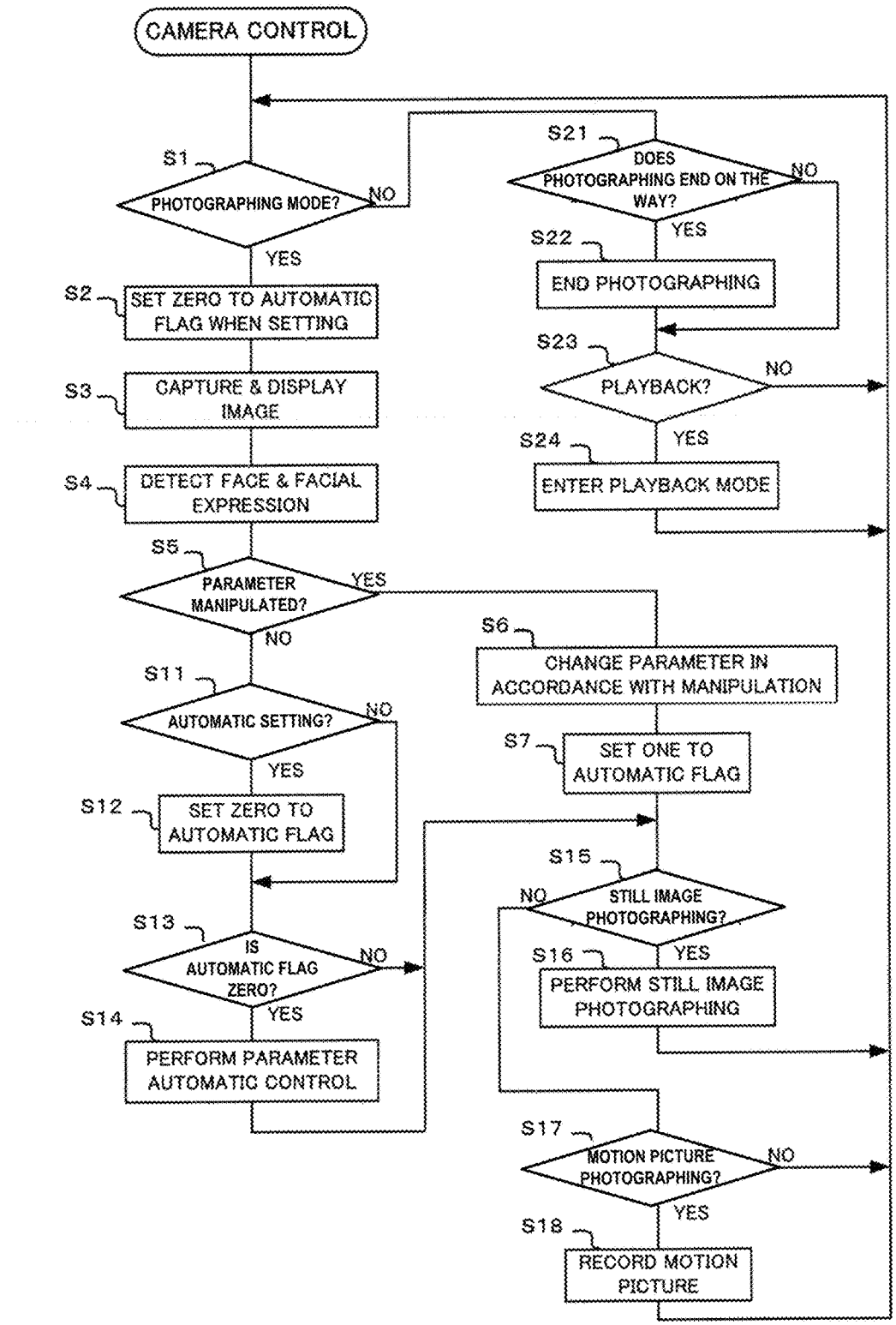
FIG. 4 is a flowchart showing the operation of camera control in the first embodiment of the present invention.

Next, the operation of the camera 10 in the present embodiment will be described using the flowchart of camera control shown in FIG. 4. The control section 1 performs processing including a flowchart, to be described later, in accordance with programs stored in the flash ROM 12. When the camera 10 is turned on and started, the flow shown in FIG. 4 is started. First, whether or not the mode is the photographing mode is determined (S1). The camera 10 comprises the photographing mode and the playback mode and the state of the mode selected by a photographer is determined based on the operation state of the operation section 9.

When the mode is the photographing mode according to the result of the determination in step S1, next, zero is set to an automatic flag if it is a timing of the initial setting of the mode setting (S2). When the automatic flag is zero, the mode is the automatic mode and when the automatic mode is set, the photographing parameters, such as the aperture and the focal length, are controlled to switch in accordance with the facial expression of the person 21 during the display of a live view and photographing of a motion picture.

When zero is set to the automatic flag, next, an image is captured and a display is produced (S3). In this step, the image data captured by the imaging section 2 is subjected to image processing in the image processing section 5 and a display of a live view is produced on the display section 8 before capturing a moving image or a still image, and during the photographing of a motion picture, a moving image during the photographing as shown in FIGS. 2A to 2C and FIGS. 3A to 3C is displayed on the display section 8.

Subsequently, the face and the facial expression are detected (S4). In this step, the face detecting section 2a detects whether the person 21 is included in the image data, and when included, the facial expression change extracting section 1a detects the facial expression of the person 21.

When the face and the facial expression are detected, next, whether or not the parameter manipulation is performed is determined (S5). Here, the parameter setting section 3 determines whether or not the manual setting of the aperture value, zooming, etc., is performed. When the parameter manipulation is not performed according to the result of the determination, next, whether or not the automatic setting is performed is determined (S11).

In step 11, whether or not the automatic mode setting button within the operation section 9 is operated, or whether or not the composition of the screen changes for a predetermined period of time is determined. Here, the predetermined period of time is set, for example, to one to three seconds, in which a viewer begins to feel that the composition does not change and is monotonous when viewing a motion picture. In the present embodiment, whether or not the automatic setting is performed is determined based on the operation state of the automatic mode setting button and the change in the composition of the screen, however, this is not limited, and either one will do.

When the automatic setting is performed according to the result of the determination in step S11, zero is set to the automatic flag (S12). As described above, at the time of initialization, zero is set to the automatic flag in step S2, however, when it is determined that the parameter manipulation is performed in step S5, one is set to the automatic flag in step S7, to be described later. When one is set to the automatic flag, zero is set to the automatic flag in step S12.

When the automatic setting is not performed according to the result of the determination in step S11, or when zero is set to the automatic flag in S12, next, whether or not the automatic flag is zero is determined (S13).

When the automatic flag is zero according to the result of the determination in step S13, the parameter automatic control is performed (S14). In the parameter automatic control, the switch control of the photographing parameters, such as the aperture and the focal length, is performed in accordance with the facial expression of the subject person 21, as described in FIGS. 2A to 2C and FIGS. 3A to 3C. The detailed operation of the parameter automatic control is described later using FIG. 5 and FIG. 6. In general, when a live view is displayed, it is frequent that the aperture is constant, such as the full aperture, however, in the present embodiment, it is made possible to confirm the change in the depth of field by varying the aperture value even when a live view is displayed.

When the parameter manipulation is performed according to the result of the determination in step S5, the parameters are changed in accordance with the manipulation (S6). In step S5, the manual setting of the aperture value, zooming etc., is performed, and therefore, in step S6, the aperture value, the focal length, etc., are changed in accordance with the manual setting. Subsequently, one is set to the automatic flag (S7). When one is set to the automatic flag, the camera is controlled based on the photographing parameters manually set by a photographer.

When the automatic flag is set to one, next, whether or not the photographing is still image photographing is determined (S15). Here, whether or not the still image release button is pressed and operated is determined. When the photographing is still image photographing according to the result of the determination, still image photographing is performed (S16). In this step, the image data output from the imaging section 2 is subjected to image processing and the image data of the still image is recorded in the recording section 6. When still image photographing is performed, the process returns to step S1.

When the photographing is not still image photographing according to the result of the determination in step S15, next, whether or not the photographing is motion picture photographing is determined (S17). Here, the motion picture button is operated in the motion picture not-photographing state is determined. When the motion picture button is operated, a flag, not shown schematically, is set until the motion picture button is operated again, and the determination result in step S17 is Yes.

When the photographing is motion picture photographing according to the result of the determination in step S17, the motion picture is recorded (S18). Here, the image data output from the imaging section 2 is subjected to image processing and the image data of the motion picture is recorded in the recording section 6. During the motion picture photographing, processing is repeated in the order of step S18→S1→S2→ . . . →S5→S11→ . . . → S15→S17→S18. Hence, when the automatic flag is set to zero, the parameter automatic control is performed in step S14, the photographing parameters are changed in accordance with the facial expression of the subject person 21, and the moving image at this time is recorded in the recording section 6. When the photographing is not motion picture photographing according to the result of the determination in step S17, the process returns to step S1.

When the mode is not the photographing mode according to the result of the determination in step S1, whether or not the photographing mode is terminated during the photographing is determined (S21). When the mode is not the photographing mode, the process advances to step S21, and in addition to this, when the motion picture button is pressed and operated again during the motion picture photographing, the process also advance to step S21. When the motion picture button is operated again during the motion picture photographing, it is determined that the photographing mode is terminated during the photographing. When the photographing mode is terminated according to the result of the determination, the photographing is terminated (S22). Here, motion picture photographing termination processing is performed.

When the termination processing in step S22 is performed, or when the photographing mode is not terminated during the photographing according to the result of the determination in step S21, next, whether or not the mode is the playback mode is determined (S23). Here, whether or not the playback mode setting button of the operation section 9 is operated is determined. When the mode is not the playback mode according to the result of the determination, the process returns to step S1.

On the other hand, when the mode is the playback mode according to the result of the determination in step S23, the playback mode is performed (S24). In the playback mode, a list of the captured images recorded in the recording section 6 is displayed on the display section 8 and an enlarged display of a thumbnail selected by a photographer is produced. When the playback mode is performed, the process returns to step S1.

As described above, in the flowchart of camera control in the present embodiment, when the automatic mode is set, the photographing parameters, such as the aperture and the focal length, are automatically switched in accordance with the facial expression of the subject. Hence, when a live view display is produced or a motion picture is recorded, the image changes in accordance with the facial expression and in particular, when a motion picture is recorded, it is possible to capture a varied image.

The parameter automatic control is performed also during the display of a live view, not limited to during the recording of a motion picture. That is, before capturing a motion picture starts, steps are performed in the order of step S1→ . . . →S5→S11→ . . . →S13→S14→S15 NO→S17 NO→S1 and in step S14, the parameter automatic control is performed and the photographing parameters are changed in accordance with the facial expression of the person 21.

Figure 5:
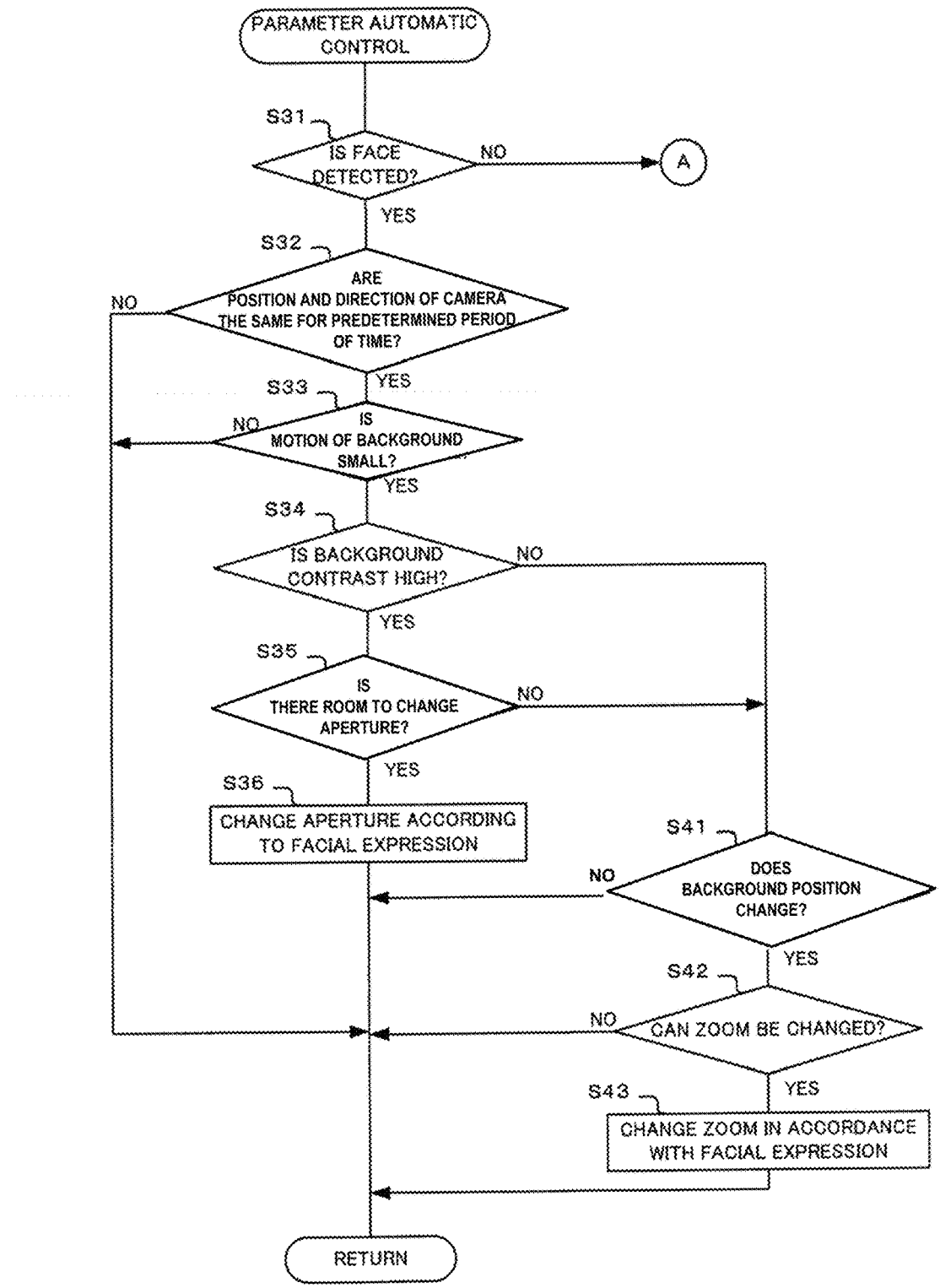
FIG. 5 is a flowchart showing the operation of parameter automatic control of the camera in the first embodiment of the present invention.

Next, the details of the parameter automatic control in step S14 are described using FIG. 5 and FIG. 6. When the flow of the parameter automatic control is started, first, whether or not a face is detected is determined (S31). The face is detected in step S4, and therefore, whether or not the parts of a face are included in the image data is determined based on the detection result.

When a face is detected according to the result of the determination in step S31, next, whether or not the position and direction of the camera are the same for a predetermined period of time is determined (S32). Here, based on the determination results of the motion determining section 4 and the composition change determining section 5, whether or not the camera 10 is photographing the same subject in the same direction is determined. Here, the predetermined period of time is assumed to be, for example, about one to three seconds, in which a viewer begins to feel that the composition does not change and is monotonous when viewing a motion picture.

When the position and direction of the camera are the same for a predetermined period of time according to the result of the determination in step S32, next, whether or not the motion of the background is small is determined (S33). Here, the composition change determining section 5 analyzes the image of the image data and makes the determination based on the motion of the background. This is because when the background is in motion, the image is not monotonous and it is inappropriate to change the photographing parameters.

When the motion of the background is small according to the result of the determination in step S33, next, whether or not the contrast of the background is high is determined (S34). Here, the image processing section 5 extracts a high-frequency component of the image data corresponding to the background part and determines whether or not the contrast is high based on the high-frequency component. When the contrast of the background is higher than the contrast of the face part of the person 21, the background gives an impression of mess, and therefore, the effect to change the aperture is significant.

When the background contrast is high according to the result of the determination in step S34, next, whether or not there is a room to change the aperture is determined (S35). When the subject is dark, if the aperture is reduced, the image becomes dark and conversely, when the subject is bright, it may be overexposed, and therefore, in this step, whether or not the exposure is allowable even if the aperture is changed is determined. This determination is made by acquiring information about the aperture value from the parameter control section 7.

When there is a room to change the aperture according to the result of the determination in step S35, next, the aperture is changed in accordance with the facial expression (S36). In this step, as described using FIGS. 2A to 2C, the parameter control section 7 changes the aperture value in accordance with the facial expression of the person 21. When the aperture is changed or when the results of the determinations in steps S32 and S33 are No, the process returns to the original flow.

When the background contrast is low according to the result of the determination in step S34, or when there is not a room to change the aperture according to the result of the determination in step S35, it is not possible to switch the aperture to another, and therefore, the photographing parameter is changed by zooming in step S41 and subsequent steps.

First, whether or not the background pattern position changes is determined (S41). For the composition in which the background is plain or the contrast thereof is not low and the pattern varies from the subject in the center of the screen toward the periphery, it is effective to change the background by zooming. When the background is plain, such as that in a certificate photograph, the change in the screen by zooming is monotonous and not interesting. Hence, in this step, the background patter is determined and whether or not the pattern changes depending on the position in the screen is determined. Only when there is a change, zooming is performed.

When there is a change in the position according to the result of the determination in step S41, next, whether or not the zoom can be changed is determined (S42). Here, whether or not the shortest focal length end or the longest focal length end of the zoom lens is reached is determined.

When the zoom can be changed according to the result of the determination in step S42, the zoom is changed in accordance with the facial expression (S43). In this step, as described using FIGS. 3A to 3C, the parameter control section 7 changes the focal length in accordance with the facial expression of the person 21. When the zoom is changed in accordance with the facial expression, or the result of the determination in step S41 or S42 is No, the process returns to the original flow.

When a face is not detected according to the result of the determination in step S31, the object is not a person because no face is detected. In this case, the object of photographing can be thought, for example, an accessory, a small item, a dish, etc., and therefore, in step S51 and subsequent steps (refer to FIG. 6), the angle of view and the aperture are changed as in the case of the photographing of a person so that a varied image can be captured.

When a face is not detected, next, whether the position remains the same for a predetermined period of time is determined (S51). Here, the composition change extracting section 1b analyzes the image data and determines whether the position of the subject can be changed. Here, the predetermined period of time is set to, for example, about one to three seconds, in which a viewer begins to feel that the composition does not change and is monotonous when viewing a motion picture.

When the position remains the same for a predetermined period of time according to the result of the determination in step S51, next, whether or not the motion of the background is small is determined (S52), similarly as in step S33. This is because performing the parameter automatic control is inappropriate when the background is in motion. The motion of the background is determined in the composition change determining section 1b.

When the motion of the background is small according to the result of the determination in step S52, next, whether or not the background contrast is high is determined (S53), similarly as in step S34. When the background contrast is high according to the result of the determination, next, whether or not there is a room to change the aperture is determined (S54), similarly as in step S35. When there is a room to change the aperture according to the result of the determination, next, whether or not the room is toward the open side is determined (S55).

When there is a room toward the open side according to the result of the determination in step S55, next, the aperture is controlled toward the open side (S56). Here, the parameter control section 7 gradually opens the aperture in the imaging section 2 toward the open side. On the other hand, when there is not a room toward the open side according to the result of the determination in step S55, the aperture is controlled toward the closed side (S57). Here, the parameter control section 7 gradually reduces the aperture toward the fully-closed side.

When the background contrast is not high according to the result of the determination in step S53, the change is small even if the aperture value is changed because the background contrast is low, and therefore, a varied image is not obtained. Hence, the angle of view is changed in step S61 and subsequent steps. First, whether or not the background pattern position changes is determined (S61), similarly as in step S41.

When the background pattern position changes according to the result of the determination in step S61, next, whether or not the zoom can be changed toward the wide side is determined (S62). When there is a room to change the zoom toward the wide side according to the result of the determination, next, zooming is performed toward the wide side (S63). Here, the parameter control section 7 gradually moves the focal length of the zoom lens toward the wide side.

On the other hand, when there is not a room to change the zoom toward the wide side according to the result of the determination in step S62, next, zooming is performed toward the telephoto side (S64). Here, the parameter control section 7 gradually moves the focal length of the zoom lens toward the telephoto side.

When zooming is performed toward the telephoto side in step S64, or when zooming is performed toward the wide side in step S63, or when the aperture is controlled toward the closed side in step S57, or when the aperture is controlled toward the open side in step S56, or when the result of the determination in step S51 or S52 is No, the change of parameters is terminated (S65) if there is an operation or motion, and the process returns to the original flow. When the photographing parameters are changed in accordance with the facial expression, the facial expression changes with time and it is possible to change the photographing parameters in accordance with the change in the facial expression. However, for other than a face, the change of parameters is carried out limitlessly, and therefore, when the composition of a subject is changed, the subject moves, or a photographer performs an operation, the change of parameters is terminated.

As described above, in the first embodiment of the present invention, a motion picture is prevented from becoming monotonous by changing the motion picture, such as blurring the background and zooming in the subject, and thus, the change in the image is made dramatic. If a motion picture is given an effect by gradually blurring the background or zooming in the subject, an image pleasant to view is obtained, however, when a user is absorbed in photographing, it is not possible for the user to perform such an operation quickly. If a user tries to perform the operation forcedly, camera shake will occur. Hence, in the present embodiment, such a kind of transition effect is automatically performed by the camera 10. However, if this is done automatically at all times, an unintended image will be obtained, and therefore, the camera 10 is so designed that such an operation is performed only when predetermined conditions to cause such a transition effect are satisfied.

The predetermined conditions to cause the transition effect include a case where there is expected an effect when the aperture is opened, for example, when there is a room for the position of the aperture and the distance to the subject is small. In this case, it may also be possible to add an image of the background. Another case is also included, where there is a room to change the zoom toward the wide side. It may also be possible to change the zoom toward the telephoto side, however, in this case, the same effect may be obtained by trimming the image after photographing. Further, another case is also included, where there is a change in the facial expression of the subject. In this case, as described in the present embodiment, it may also be possible to change the effect of the background in accordance with the change in the facial expression.

Next, a modified example of the first embodiment of the present invention will be described using FIGS. 7A to 7C. In the first embodiment, when the composition or the subject remains the same, the moving image is monotonous and lacks attractive appeal, and therefore, the photographing parameters are switched and the transition effects are enjoyed. However, if such changes in the photographing parameters begin suddenly in the automatic parameter mode, there is a case where such changes are against a photographer's intension. Hence, in the present modified example, changes are not begun suddenly, but an advice display is produced on an advice display section 8b in the display section 8.

Figure 7A:
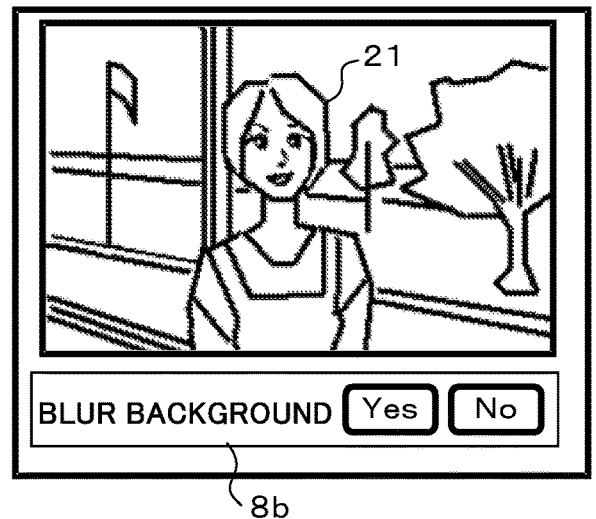
FIGS. 7A to 7C are diagrams showing displays on a display section when parameter automatic control is performed in a modified example of the camera in the first embodiment of the present invention.
Figure 7B:
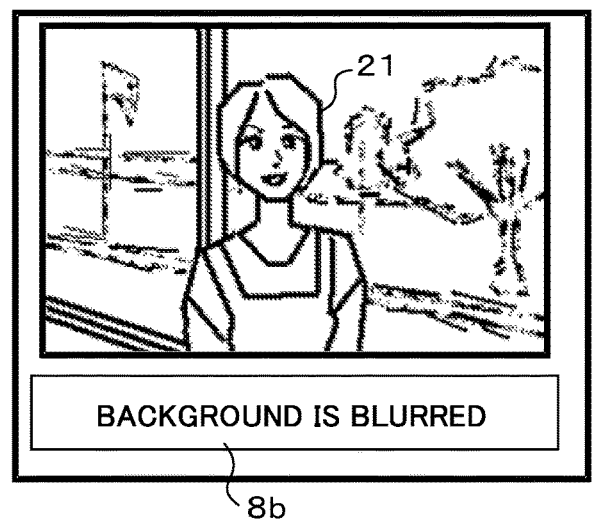
Figure 7C:
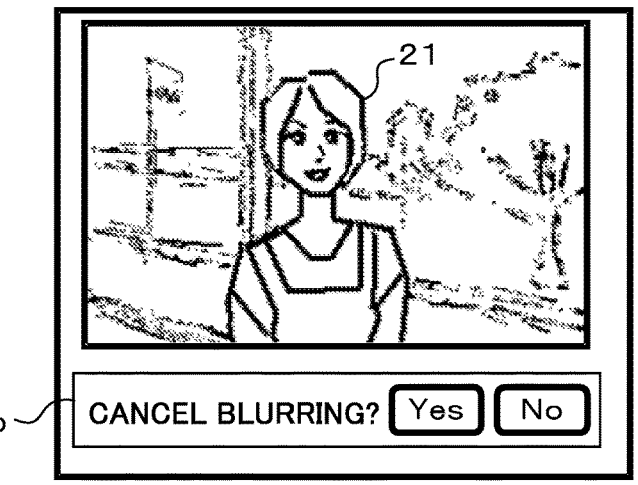

FIGS. 7A to 7C show examples of advice displays. In the state in FIG. 7A, the degree of smile of the person 21 is high, and therefore, the control is performed to blur the background so that the person becomes outstanding in the automatic parameter control. In the present modified example, before the control to blur the background is started, "Blur background" is displayed on the advice display section 8b and at the same time, "Yes" used when a photographer permits the blurring of the background and "No" when not permitting are displayed as shown in FIG. 7A. A touch panel is provided on the front surface of the display section 8, and thereby, the photographer can select by touching either button.

Blurring the background should not be performed simply because the aperture can be changed, but it should be determined whether the scene is such one in which the background includes various objects as shown in FIG. 7A and blurring the background brings about the effect of a close-up of the person. When the background is plain or includes a monotonous landscape, such an effect is not brought about and when a person is within a predetermined distance and the composition is a bust shot or a close-up shot, and not only the background but also other parts are blurred, such an advice display to blur the background is not produced.

When a photographer permits to blur the background, the parameter control section 7 moves the aperture toward the open side to blur the background and at this time, the control state of the photographing parameter is displayed on the advice display section 8b as "Background is blurred" (refer to FIG. 7B). When the limit value of the photographing parameter is reached, the photographing parameter cannot be changed any more, and therefore, as shown in FIG. 7C, "Cancel blurring?" is displayed on the advice display section 8b. At this time, "Yes" used to permit returning photographing parameter to the original one (aperture value in the case of the figure) and "No" when not permitting are displayed.

The configuration of the modified example of the first embodiment is the same as that in FIG. 1 and what is required is only to add a display step and a determination step appropriately to the flowchart shown in FIG. 4 to FIG. 6, and therefore, its detailed description is omitted.

Next, a second embodiment of the present invention will be described using FIG. 8 to FIG. 10. In the first embodiment, one of the photographing parameters, that is, the aperture or the focal length, is controlled in accordance with circumstances. In contrast to this, in the second embodiment, it is possible to obtain a more varied image by changing both the aperture and the focal length. In the first embodiment, a photographer instructs to start and end motion picture photographing by operating the motion picture button and all of the image data is recorded in the meantime. In contrast to this, in the second embodiment, a motion picture corresponding to the part of image data including the change in the facial expression and the best facial expression is recorded automatically. The configuration in the second embodiment is the same as the block diagram shown in FIG. 1 in the first embodiment, and therefore, its detailed description is omitted.

Figure 8A:
FIGS. 8A to 8E are diagrams for illustrating how to capture a varied moving image with a camera according to a second embodiment of the present invention.
Figure 8B:
Figure 8C:
Figure 8D:
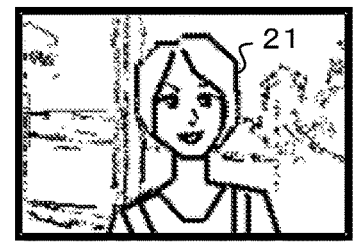
Figure 8E:
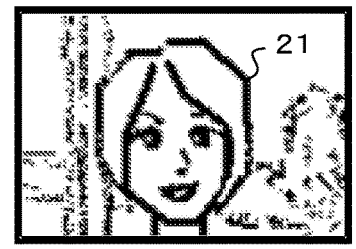

FIGS. 8A to 8E show images in the present embodiment. In the present embodiment also, the automatic parameter control is performed similarly as in the first embodiment, and therefore, it is possible to obtain a varied moving image in which the background is blurred or a person is closed-up only by holding and directing the camera 10 to the same subject as shown in FIGS. 8A to 8E. In the present embodiment, the person 21 in the image in FIG. 8E shows the best facial expression, and therefore, only the moving image from when the photographing parameter begins to change in FIG. 8B to when the best facial expression is shown is recorded.

Figure 9:
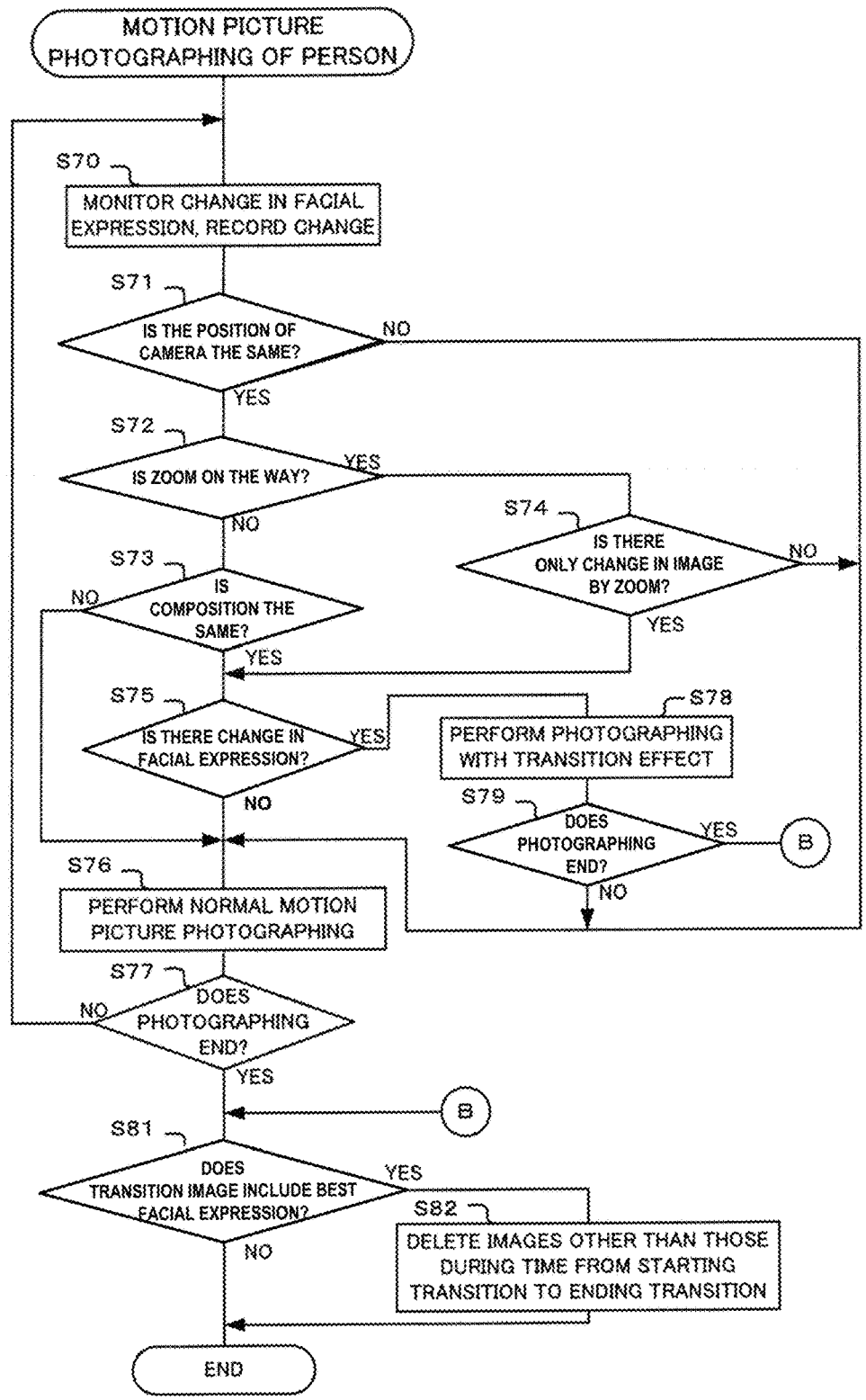
FIG. 9 is a flowchart showing the operation of capturing a motion picture of a person with the camera in the second embodiment of the present invention.
Figure 10:
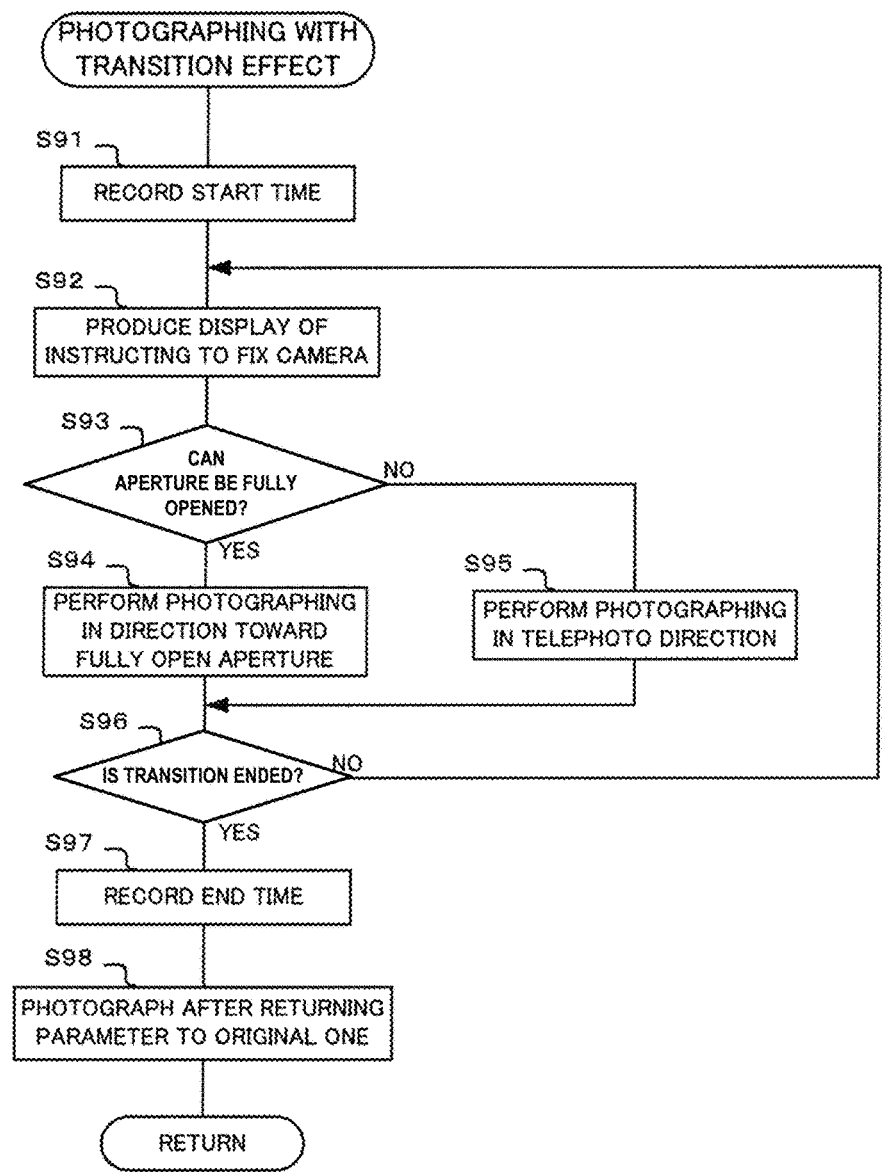
FIG. 10 is a flowchart showing the operation of capturing a motion picture of a person with the camera in the second embodiment of the present invention.

The flowchart of motion picture photographing of a person that enables such moving image photographing is described using FIG. 9 and FIG. 10. In this flowchart, the general processing is omitted, such as the determination of the photographing mode in step S1 in the camera control shown in FIG. 4. When the motion picture photographing of a person is started, the flow shown in FIG. 9 is started, and the change in the facial expression is monitored first and the change is recorded (S70). Here, the facial expression change extracting section 1a determines the facial expression (degree of smile) of a person and temporarily records the determination result in the recording section 6.

Subsequently, whether or not there is a change in the way to hold the camera is determined (S71). Here, the composition determining section 1b determines whether or not there is a change in the way to hold the camera 10 based on the output of the hexaxial sensor etc. within the motion determining section 4. The motion determination may be made not only by the motion determining section 4 but also by the image processing section 5 based on the change in image. When the way to hold the camera does not change according to the result of the determination, next, whether or not zooming is on the way is determined (S72). There is a case where zooming is performed in step S95 (refer to FIG. 10), to be described later, and in this step S72, whether or not zooming is in operation is determined. Whether or not zooming is on the way is determined to avoid erroneous operations in the determination of the change in composition in step S73.

When zooming is not on the way according to the result of the determination in step S72, that is, when zoom operation is not being performed, next, whether or not there is a change in composition is determined (S73). Whether or not there is a change in composition is determined by the composition change determining section 1b based on the image data.

When zooming is on the way according to the result of the determination in step S72, next, whether or not there is only a change in image by zooming is determined (S74). Here, whether or not the change in composition is only the change in image by the change in zoom is determined. Specifically, the composition change determining section 1b acquires information about the focal length of the zoom lens from the parameter control section 7, performs image correction of the image data based on the information about focal length, and determines whether or not there is a change in the corrected image.

When there is only a change in image by zooming according to the result of the determination in step S74, or when there is not a change in composition according to the result of the determination in step S73, next, the facial expression change extracting section 1a determines whether or not there is a change in facial expression (S75). When there is a change in facial expression according to the result of the determination, photographing with a transition effect is performed (S78). Here, as described in FIG. 8, the aperture and the angle of view are controlled based on the facial expression of the person 21. Detailed operation of the photographing with a transition effect will be described later using FIG. 10.

When the photographing with a transition effect is performed, next, whether or not the photographing ends is determined (S79). The photographing ends when the motion picture button of the operation section 9 is operated again, and therefore, in this step, the operation state of the motion picture button is determined.

When the photographing does not end according to the result of the determination in step S79, or when there is not a change in facial expression according to the result of the determination in step S75, or when there is not a change in composition according to the result of the determination in step S73, or when there is not only a change in image by zooming according the result of the determination in step S74, next, normal motion picture photographing is performed (S76). Here, the image data output from the imaging section 2 is subjected to image processing and then recorded in the recording section 6. It is of course possible to record as a still image by pressing to operate the still image release button at the timing after the normal motion picture photographing in step S76. In this case, an image, in which the effect of the change in the photographing parameters is reflected, is displayed on the display section 8 and if there is an image that a photographer is interested in, it is possible to perform photographing of a still image at this timing.

Subsequently, whether or not the motion picture photographing is ended is determined (S77). Here, similarly as in step S79, the determination is made based on the operation state of the motion picture button of the operation section 9. When the photographing is not ended according to the result of the determination, the process returns to step S70. Consequently, when the flow of the motion picture photographing of a person is started, normal motion picture photographing is performed continuously in step S76, however, when a monotonous image results even when there is a change in facial expression of a person, that is, the way to hold the camera remains unchanged, the composition is not changed, but there is a change in facial expression of a person, it is designed so that the photographing with a transition effect is performed in step S78.

When the photographing is ended according to the result of the determination in step S77 or S79, next, whether or not the best facial expression of a transition image is included is determined (S81). In step S70, the change in facial expression, such as the degree of smile, is recorded and the photographing with a transition effect in step S78 is performed, and therefore, in this step S81, whether or not the image of the best facial expression is included in the image captured with a transition effect is determined.

When the best facial expression is included in the transition image according to the result of the determination in step S81, next, images other than between the start of the transition to the end thereof are deleted (S82). That is, the normal motion picture photographing is performed, however, if the best facial expression is included in the image captured with the transition effect when the facial expression changes, only the moving images in the interval during which the photographing with the transition effect is performed are left and moving images in other intervals are deleted.

Next, the photographing with a transition effect in step S78 will be described using the flowchart shown in FIG. 10. When the flow of the photographing with a transition effect is started, first, the starting point of time is recorded (S91). Here, information about date and time output from the clock section within the camera 10, not shown schematically, is recorded. Subsequently, a display of instructing to fix the camera is produced (S92). Here, such a display is produced on the display section 8 that instructs to fix the camera 10, preventing the change in the direction of the camera 10.

When the display of instructing to fix the camera is produced, next, whether or not the aperture can be opened fully is determined (S93). Here, information about the current aperture value is acquired from the parameter control section 7 and compared with the fully open aperture value, and then, whether or not the aperture can be still opened toward the fully open direction is determined. When the aperture can be fully opened according to the result of the determination, photographing with fully open aperture is performed (S94). Here, the parameter control section 7 is instructed to drive the aperture fully open.

When the aperture cannot be fully opened according to the result of the determination in step S93, next, photographing toward the telephoto direction is performed (S95). Here, the parameter control section 7 is instructed to drive the zoom lens toward the telephoto side. As described above, when the aperture can be driven fully open, the aperture is fully opened and when the aperture cannot be driven fully open, the zoom lens is driven toward the telephoto side.

When the photographing in the direction of fully open aperture in step S94 is performed, or when the photographing in the telephoto direction in step S95 is performed, next, whether or not transition is completed is determined (S96). Here, whether the fully open aperture value is reached in the fully open aperture photographing or whether the telephoto end is reached in the photographing in the telephoto direction is determined. When the transition is not completed according to the result of the determination, the process returns to step S92.

On the other hand, when the transition is completed according to the result of the determination in step S86, the completion point of time is recorded (S97). The starting point of time is recorded in step S91 and the completion point of time is recorded in step S97, and therefore, the interval during which the transition photographing is performed is recorded.

When the completion point of time is recorded, next, the photographing parameters are reset to the initial ones and photographing is continued (S96) and the process returns to the original flow. In steps S94 and S95, the aperture is driven to the fully open aperture value or the zoom lens is driven to the telephoto end, and therefore, in this step S96, the photographing parameters are reset to those before the drive and the photographing is continued.

As described above, in the present embodiment, when the camera 10 is photographing the motion picture of the same person, in order to prevent an image from becoming monotonous, the photographing parameters are changed and the photographing with a transition effect is performed when the facial expression of the person changes. Further when the best facial expression is included in the images captured by the photographing with a transition effect, the images in the interval are saved and the other images are deleted.

During the normal motion picture photographing, when the photographing with a transition effect is performed a plurality of times, the images in the interval in which the facial expression is best are saved, however, this is not limited, and all of the images captured by the photographing with a transition effect may be saved or the best two more images with the transition effect may be saved.

Figure 11:
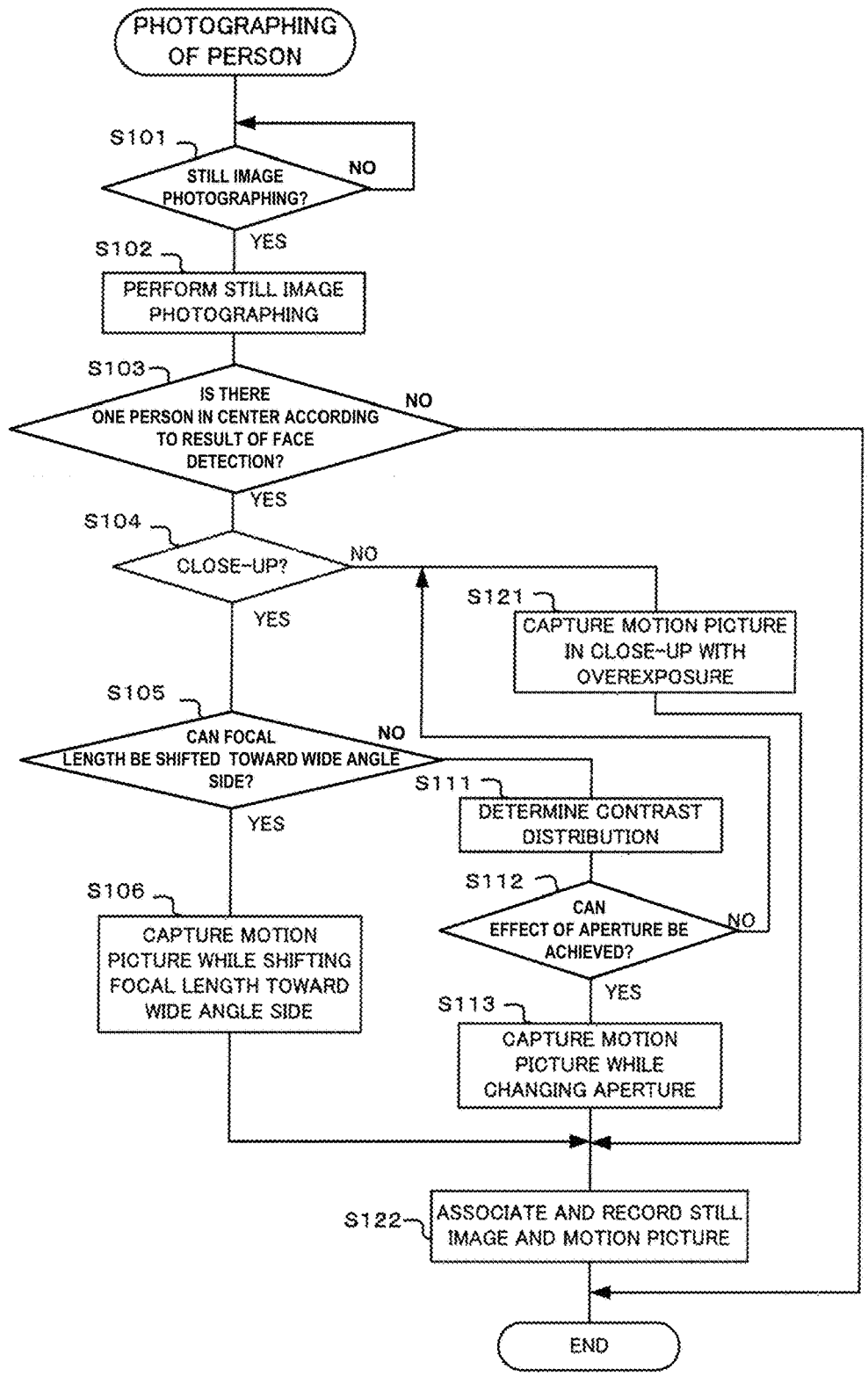
FIG. 11 is a flowchart showing the operation of photographing a person with a camera in a third embodiment of the present invention.

Next, a third embodiment of the present invention will be described using FIG. 11. In the first and second embodiments, a varied image is captured by changing the photographing parameters during the photographing of a motion picture. In the third embodiment, a more varied image is captured by capturing a motion picture while changing the photographing parameters following the still image photographing.

In general, when photographing a still image, in most cases, the best facial expression of a subject is captured, and it may also be possible to perform a motion picture photographing of the change in facial expression when the subject relaxes after a still image photographing with the transition effect of an image. In this case, it is convenient if a motion picture is captured automatically with the same operation as that to photograph a still image without the need to set the motion picture photographing purposely. Further, if a motion picture with the transition effect is captured following a still image, it is possible to create a new motion picture by synthesizing the motion picture with another and the synthesized motion picture can be made use of as a raw material. It becomes also possible to represent the passage before a still image is captured by rewinding and playing back the motion picture.

The configuration in the present embodiment is the same as the block diagram shown in FIG. 1 in the first embodiment, and therefore, its detailed explanation is omitted. The flowchart of photographing a person in the present embodiment is described using FIG. 11. In this flowchart also, general processing, such as the determination of the photographing mode in step S1 in the camera control shown in FIG. 4, etc., is omitted. When the flow of photographing a person shown in FIG. 11 is started, first, whether or not still image photographing is performed is determined (S101). Here, the operation state of the still image release button of the operation section 9 is determined.

When the still image release button is operated after letting time elapse while waiting, the still image photographing is performed (S102). Here, the image data output from the imaging section 2 is subjected to image processing by the image processing section 5 and the image data of the still image subjected to the processing is recorded in the recording section 6.

When the still image photographing is performed, next, whether or not only one person is in the center is determined (S103) according to the result of face detection by the face detecting section 2a. When there are two or more persons according to the result of the determination, this is not suitable for the photographing while changing the photographing parameters, such as the angle of view and aperture, and therefore, this flow is terminated.

On the other hand, when there is only one person according to the result of the determination in step S103, next, whether or not the face is in a close-up state is determined (S104). Here, whether not the size of the face detected by the face detecting section 2a is in a close-up state where it occupies almost all the area of the screen is determined.

When the face is not in a close-up state according to the result of the determination in this step S104, next, motion picture photographing is performed in a close-up with an overexposure (S121). Here, the motion picture photographing is performed by instructing the parameter control section 7 to gradually drive the focal length toward the telephoto side and at the same time, to gradually change the electronic shutter speed, the ISO sensitivity, etc., so that an overexposure is achieved. When the focal length is near the telephoto end, it may also be possible to achieve a close-up by electronic zooming. Further, the photographing time of the motion picture may be a predetermined period of time or the time until the telephoto end is reached.

In step S121, achieving an overexposure may be omitted, or it may also be possible to perform photographing while changing other photographing parameters instead of achieving an overexposure, for example, while changing the focus position of the zoom lens. Some persons do not desire their faces to be photographed clearly, and in such a case, a close-up is omitted and the exposure and the focus may be changed considerably so that their faces are unclear.

When the face is in a close-up state according to the result of the determination in step S104, next, whether or not the focal length can be shifted toward the wide angle side is determined (S105). Here, the determination is made by acquiring information about the current focal length from the parameter control section 7 and comparing it with the focal length of the wide end.

When the focal length can be shifted toward the wide angle side according to the result of the determination in step S105, next, motion picture photographing is performed while shifting the focal length toward the wide angle side (S106). Here, a motion picture is recorded based on the image data output from the imaging section 2 while instructing the parameter control section 7 to gradually change the focal length toward the wide angle side. The photographing time at this time may be a predetermined period of time, or the time until the wide end is reached.

When the focal length cannot be shifted toward the wide angle side according to the result of the determination in step S105, next, the contrast distribution is determined (S111). Here, the image processing section 5 extracts a high-frequency component of the image data and determines the contrast distribution.

When the contrast distribution determination is made, next, whether or not the effect of aperture can be achieved is determined (S113). When the current aperture value is near the fully open state, the depth of field can be made deeper by reducing the aperture and when the current aperture value is near the smallest aperture, the depth of field can be made shallower by opening the aperture toward the fully open side. In this step, whether or not the effect of aperture can be achieved is determined from the relationship between the current aperture value and the contrast distribution.

When the effect of aperture can be achieved according to the result of the determination in step S112, motion picture photographing is performed while changing the aperture (S113). Here, the parameter control section 7 is instructed to change the aperture value toward the direction in which the effect of aperture can be achieved determined in step S112. The photographing time at this time may be a predetermined period of time or may be the time until the fully open aperture value or the smallest aperture value is reached. On the other hand, when the effect of aperture cannot be achieved according to the result of the determination, the process advances to the above-described step S121 and photographing is performed in a close-up with an overexposure.

When motion picture photographing is performed while changing the aperture in step S113, or when motion picture photographing is performed while shifting the focal length toward the wide angle side in step S106, or when motion picture photographing is performed in a close-up with an overexposure in step S121, next, the still image and the motion picture are associated with each other and then recorded (S122). Here, the image data of the still image captured in step S102 and the image data of the motion picture captured in step S106, S113, or S121 are associated with each other. After the recording is completed, the flow of photographing a person ends.

As described above, in the third embodiment, during the still image photographing, a motion picture is captured while changing the photographing parameters. Hence, it becomes possible to view not only a mere still image but also a varied motion picture. Further, the still image and motion picture can be used as raw materials when editing these images to create a motion picture.

As described above, in each embodiment of the first to third inventions, during the recording of a motion picture based on image data, the photographing parameters are changed in accordance with the motion of a photographer and a subject regardless of the photographing parameters manually or automatically set, and therefore, it is possible to capture a varied image in photographing.

Further, in the embodiments of the present invention, it is made possible to capture a motion picture with changed photographing parameters regardless of the photographing parameters manually set following the recording of a still image, and therefore, it is possible to capture a varied image.

Furthermore, in the embodiments of the present invention, before recording a motion picture and when a live view is displayed, the photographing parameters are changed regardless of the photographing parameters manually or automatically set, and therefore, it is possible to confirm in advance whether or not a varied image can be captured by photographing. When a live view is displayed, the aperture and the angle of view are changed, and therefore, it is possible to capture a still image when an image a photographer is interested in appears.

In the first to third embodiments of the present invention, as the photographing parameters, the aperture value and the focal length (zoom) are described, however, these are not limited, and it may also be possible to sequentially switch the focus positions or change the exposure (exposure correction value).

In the first to third embodiments of the present invention, the degree of blurring as a photographing parameter is changed by controlling the aperture value, however, it may also be possible to change the degree of blurring by performing image processing instead of the aperture when the background is blurred by image processing.

The facial expression change DB 6a in the first to third embodiments of the present invention stores a database indicative of the relationship between the shapes, positions, etc., of the parts of a face, such as eyes, nose, mouth, etc., and the facial expression of the face, however, it may also be possible to store data of speed when the facial expression changes, in addition to the relationship. Further, in the embodiments, the photographing parameters are switched based on the facial expression, such as the degree of smile, however, it may also be possible to control the change of photographing parameters using the data about the speed of change in facial expression while predicting the change. Furthermore, in the embodiments, the facial expression is determined by the face detecting section 2a as a motion of a subject and the photographing parameters are changed based thereon, however, this is not limited and it may also be possible to change the photographing parameters based on the motion of arm, motion of head, etc. Still furthermore, in the embodiments, the motion of a photographer is determined by the motion determining section 4 and whether or not the photographing parameters are changed is determined based on the result of the determination, however, it may also be possible to change the photographing parameters directly in accordance with the motion of a photographer.

Next, a fourth embodiment of the present invention will be described using FIG. 12 to FIG. 23. When a still image is captured and then a motion picture is captured for a predetermined period of time following the still image photographing, a varied image can be obtained.

Figure 12:
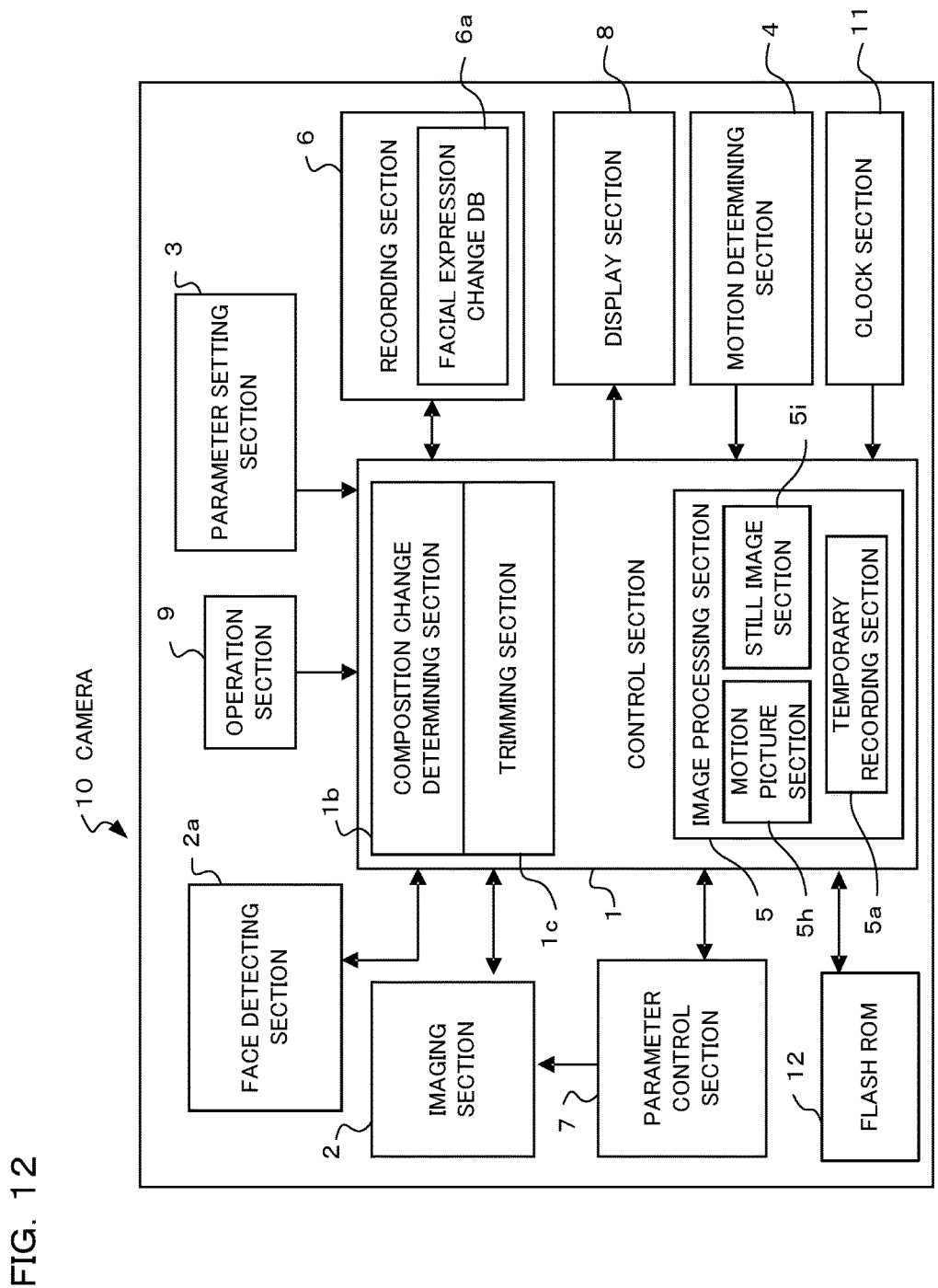
FIG. 12 is a block diagram showing an electrical configuration of a camera according to a fourth embodiment of the present invention.

FIG. 12 is a block diagram showing an electric circuit of the camera 10 according to the fourth embodiment of the present invention. The camera 10 is a digital camera and includes the control section 1, the imaging section 2, the face detecting section 2a, the parameter setting section 3, the motion determining section 4, the recording section 6, the parameter control section 7, the display section 8, the operation section 9, a clock section 11, the flash ROM 12, etc.

Like the imaging section 2 in the first embodiment, the imaging section 2 includes a photographic lens (zoom lens) having a zoom function, exposure control sections, such as a shutter and aperture, an image sensor, drive and read circuits of the image sensor, etc., and converts a subject image formed by the photographic lens into image data by the image sensor and outputs the image data. The photographic lens of the imaging section 2 includes a focus adjustment lens and its mechanism and in the fourth embodiment, it is also possible to capture a transition motion picture while shifting the focus. It may also be possible to provide an aperture adjusting mechanism for blurring the background. The face detecting section 2a is the same as the face detecting section 2a in the first embodiment, and therefore, its detailed description is omitted.

The control section 1 controls the total sequence of the camera 10 in accordance with the programs stored in the flash ROM 12. The control section 1 has the composition change determining section 1b, a trimming section 1c, and the image processing section 5. The composition change determining section 1b is the same as that in FIG. 1, and therefore, its detailed description is omitted. It may also be possible to provide the facial expression change extracting section 1a shown in FIG. 1 within the composition change determining section 1b. It may also be possible to design the facial expression change extracting section so as to predict the change in facial expression based on the speed of the change when the facial expression changes in determining the change in facial expression.

The trimming section 1c performs trimming processing to trim part of image data output from the imaging section 2. The trimming section 1c trims an image in the center of the screen when trimming image data, however, it may also be possible to design the trimming section 1c so as to trim the periphery of the face of a subject based on the position, size, etc., of the face detected by the face detecting section 2a, in addition to the central image.

The image processing section 5 has a temporary recording section 5a, the motion picture section 5h, and the still image section 5i and takes in image data output from the imaging section 2, performs various kinds of image processing, such as thinning processing, trimming processing, edge enhancement, color correction, and image compression, and performs image processing for displaying a live view of a motion picture, recording a still image and motion picture in the recording section 6, and playing back and displaying a still image and motion picture. For image compression/decompression, the image processing section 5 has circuits for a still image and motion picture in accordance with processing, such as a still image compression/decompression circuit and a motion picture compression/decompression circuit. It is also possible for the image processing section 5 to acquire a motion vector based on image data. As will be described later, the temporary recording section 5a is a memory for temporarily recording image data of a motion picture captured following the still image photographing. Details of the image processing section 5 will be described later using FIG. 13.

The operation section 9 includes various operation members, such as a release button, a power switch, a playback mode setting button, a menu button, and an art mode button, and determines the operation state of these operation members and sends the determination result to the control section 1. The control section 1 described above controls photographing and playback in a predetermined sequence in accordance with the operation state of the operation members. The art mode button is an operation member to set the art mode, and when the art mode is set, a motion picture is captured (continuous shooting) while changing the photographing parameters following the still image photographing. The art mode may be set from a menu screen that is displayed on the display section 8 by the menu button without the need to provide the art mode button. Alternatively, it may also be possible to design so that the art mode is always set at the time of still image release without providing the art button.

The display section 8 has a display section, such as a liquid crystal panel and an organic EL panel, disposed on the backside etc. of the camera 10, like the display section 8 in the first embodiment, and produces a live view display before photographing, a normal playback display of a recorded image, a camera information display, etc. It is possible for a photographer to observe the live view display to determine a composition and timing. Further, the display section 8 in the present embodiment produces a playback display of an image captured in the art mode in which a motion picture is captured following the still image photographing.

The clock section 7 performs a timing operation and outputs information about the date and time of photographing. The information about the data and time of photographing is recorded at the same time when image data of a still image and motion picture is recorded in the recording section 6. When photographing in the art mode, the information is used to determine whether or not a predetermined period of time elapses after the photographing of a motion picture (continuous shooting) is started following the still image photographing.

The parameter setting section 3, the determining section 4, the recording section 6, and the flash ROM 12 are the same as the parameter setting section 3 etc. in the first embodiment, and therefore, their detailed description is omitted.

Figure 13:
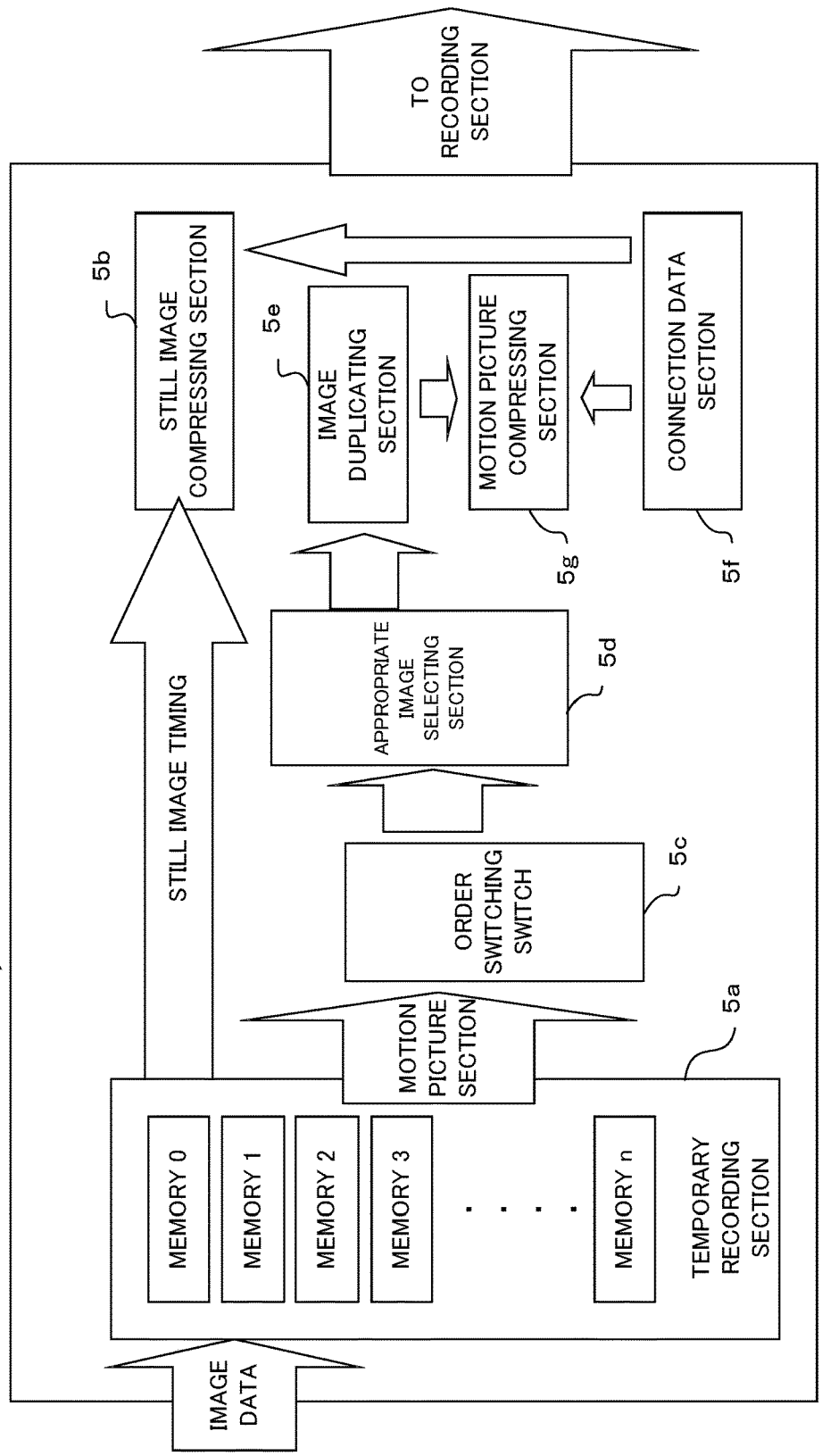
FIG. 13 is a block diagram showing details of an image processing section of the camera according to the fourth embodiment of the present invention.

Next, the detailed configuration of the image processing section 5 will be described using FIG. 13. As described above, the image processing section 5 takes in image data output from the imaging section 2 and performs various kinds of image processing, such as thinning processing and trimming processing, however, the configuration relating to generation of image data for the reverse playback of a motion picture in the art mode is mainly described here.

The temporary recording section 5a is a memory for temporarily recording image data from the imaging section 2 and has a memory 0 for temporarily recording image data of a still image and a memory 1 to a memory n for temporarily recording image data corresponding to each frame of a motion picture captured (continuous shooting) following the still image. The memory 0 for temporarily storing image data of a still image is connected to a still image compressing section 5b. The still image compressing section 5b performs compression of an image, such as JPEG.

The memory 1 to the memory n for recording image data of each frame of a motion picture (continuous shooting) are connected to an order switching switch (SW) 5c. The order switching switch 5c switches the order of image data of each frame temporarily recorded in the memory 1 to the memory n. That is, after a motion picture is recorded, the last image data temporarily recorded in the memory n is read first, and then, image data is read in order of the memory n−1, the memory n−2, . . . , the memory 2, and the memory 1. Due to this, it is possible to play back an image as if time were reversed.

The order switching switch 5c is connected to an appropriate image selecting section 5d. The appropriate image selecting section 5d selects images of the image data temporarily recorded in the memory 1 to the memory n, which are suitable for a motion picture (continuous shooting), for example, images other than those in which the composition changes rapidly or blurred images. The appropriate image selecting section 5d is connected to an image duplicating section 5e. As will be described later, when photographing is completed, a motion picture captured for 0.5 seconds is expanded to two seconds and a playback display is produced. The image duplicating section 5e performs duplication while interpolating image data of each frame of the motion picture to expand the time of the image.

The image duplicating section 5e is connected to a motion picture compressing section 5g. The motion picture compressing section 5g performs motion picture compressing on the image data expanded to two seconds by the image duplicating section 5e with MPEG 4, motion JPEG, etc. A connection data section 5f connects the image data of the motion picture generated by the motion picture compressing section 5g and the image data of the still image generated by the still image compressing section 5b and generates information about connection for continuously playing back both the image data. The information about connection of the connection data section 5f, the image data from the still image compressing section 5b, and the image data from the motion picture compressing section 5g are sent to the recording section 6 and recorded as one image file.

Figure 14:
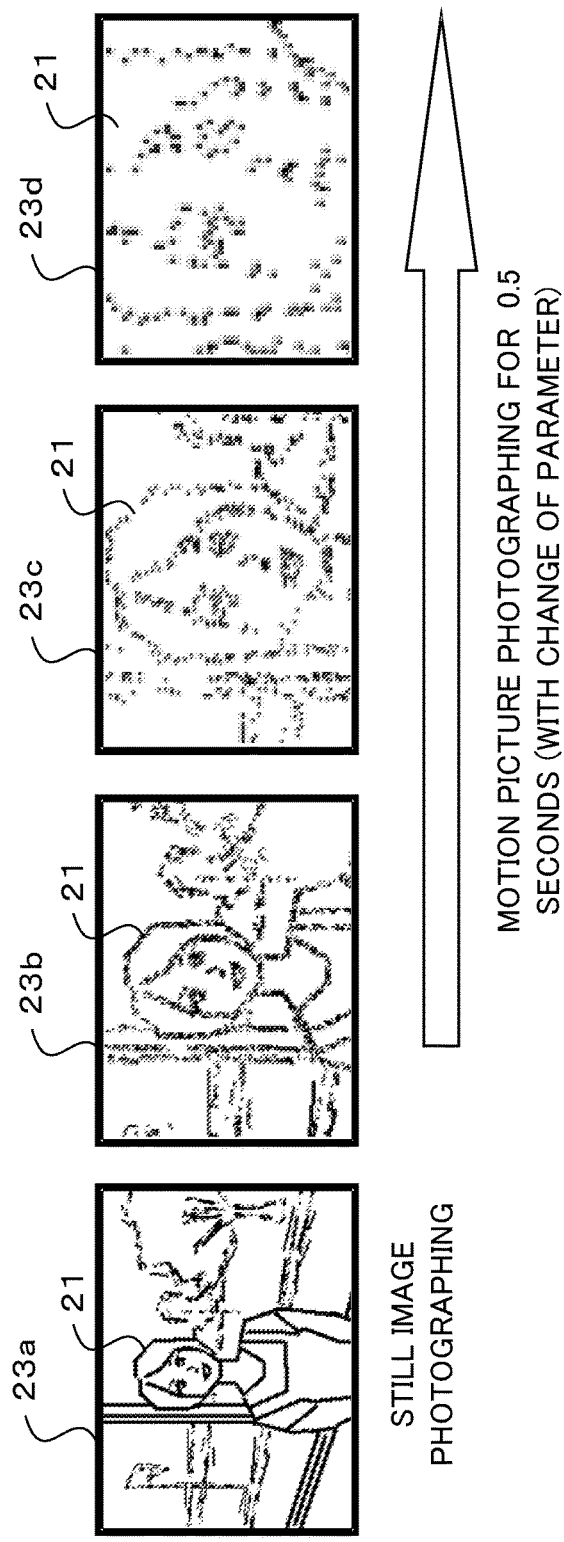
FIG. 14 is a diagram showing a still image and an image of a motion picture to be continuously captured with the camera according to the fourth embodiment of the present invention.

Next, photographing in the art mode by the camera 10 according to the present embodiment will be described using FIG. 14. An image 23a shown in FIG. 14 is an image captured when a photographer determined a composition, photographing parameters (part of which were automatically determined), and a timing to photograph, and photographed the subject person 21 in a still image.

An image 23b to an image 23d are images sequentially captured as a motion picture (continuous shooting) following the image 23a captured as a still image. The essential photographing is completed in the still image, and therefore, the photographing parameters determined by the photographer or determined automatically by the camera 10, the composition determined by the photographer, etc., may be invalidated and the image in the motion picture is more interesting because there is a motion therein. However, it is not easy to move the subject, and therefore, in the present embodiment, the photographing parameters are changed and thus the image is made dynamic.

In the examples shown in the image 23b to the image 23d, the effect of the change of photographing parameters is given, which is obtained by a close-up with an overexposure. As the operation to change the photographing parameters, it may also be possible to shift the focus position of the photographic lens. By shifting the focus position, such an effect that the face of a person becomes hazier can be obtained. In this case, this may be done along with the change in exposure correction value and zoom, or may be done alone. It may also be possible to blur the background by changing the aperture.

As described above, in the photographing in the art mode in the present embodiment, an image at a critical moment is captured in a still image and a motion picture is captured for a brief time after that. With the photographing in the art mode, it is possible for a user not having experienced photographing of a motion picture to easily enjoy dynamic motion picture photographing. With the photographing in the art mode, it becomes possible for a user to capture a varied picture without the need to manipulate the photographing parameters, such as the aperture.

Further, in the present embodiment, as will be described later, it is also possible to display how an image is formed on the display section 8 using image data acquired in the art mode after the photographing. If a user sees an image to which an effect by the art mode is given before photographing, it becomes difficult for the user to determine a composition and photo opportunity.

Next, a playback display produced by combining a plurality of images captured in the art mode (still image with a motion picture) described in FIG. 14 will be described using FIG. 15. When the still image with a motion picture shown in FIG. 14 is played back and displayed continuously as shown in FIG. 15, it is possible to enjoy the image as a slide show like a motion picture with the change in facial expression etc.

In an example shown in FIG. 15, after the still image photographing (refer to images 24a, 24e), zooming is performed while opening the aperture and thus images of the motion picture in which the background is blurred (image 24b to image 24d, image 24f to image 24h) are obtained. At this time, it is possible to enjoy how the facial expressions of the persons 21, 22 change.

At this time, it may also be possible to add an effect that seems to be liked by the person photographed instead of simply giving the transition effect at all times. For example, it may also be possible to add changes, for example, the exposure for a person A, the focus position for a person B, the zoom for a person C, and the aperture for a person D. It is of course possible to switch the transition effect to another by determining when the facial expression changes, or when the person blinks.

The image data used to produce a playback display as shown in FIG. 15 may be edited before playback, however, in the present embodiment, in steps S219, S221 (refer to FIG. 19) to be described later, the image data is generated as an image file when the image data is recorded at the time of photographing. When the photographing points of time are close to each other, both the image data are combined. It may be, of course, possible to enjoy the image data as a still image with the transition effect in which the image fades out when viewing the image, rather than editing the image data into a still image with a plurality of motion pictures.

Next, a case is described using FIG. 16, where a still image with a motion picture is handled as a motion picture, an auxiliary image, and reverse playback is performed. In the reverse playback, a moving image is handled as a decorated image or art image of the face of a person rather than an accurate recorded image. In an example shown in FIG. 16, the motion picture captured in FIG. 14 is played back from the frame captured last and a still image captured first is displayed as a final piece. It may also be possible to represent in a motion picture the state before a finished image is set as a still image.

That is, when photographing, a still image 26d is captured first and then, images 26c, 26b and 26a are captured as a motion picture in this order for 0.5 seconds. When the captured images are played back reversely, the motion picture is played back reversely for two seconds from the image 26a captured last to the images 26b and 26c in this order and finally, the image 26d captured as a still image is displayed as a critical piece.

Recently, an image sensor has been developed, which can capture images of hundreds of frames per second, and a playback in such a slow motion can be performed easily. Whether or not such a reverse playback is permitted can be determined by determining the change in facial expression of a subject and referring to the facial expression change DB6a, and the reverse playback may be permitted only when the change in facial expression is not unnatural in the reverse playback. For example, in the case of a repetitive motion of, such as blinking, it may also be possible to arrange a motion picture in the reverse direction before a still image and a motion picture in the forward direction after the still image, and thus enabling a repetitive playback.

In the art mode in the present embodiment, after a still image is captured, a subject is also photographed in a motion picture (continuous shooting), and therefore, if the camera 10 is not directed toward the subject for a predetermined period of time after the still image photographing (0.5 seconds in the embodiment), an unsightly image may be obtained. Hence, in the present embodiment, the person 21 positioned in the center of the screen is extracted automatically and recorded with the face part of the person 21 being trimmed, in order not to apply a stress more than necessary to a photographer.

Figure 17:
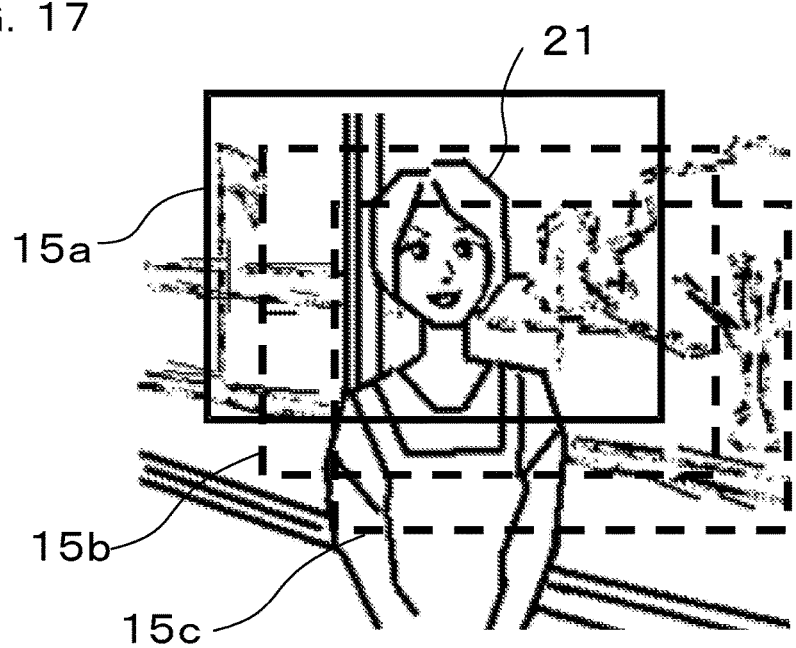
FIG. 17 is a diagram showing the way the orientation of the camera is changing after a still image is captured with the camera according to the fourth embodiment of the present invention.

A trimming method will be described using FIG. 17 and FIGS. 18A to 18F. FIG. 17 shows the way to photograph the subject person 21. A still image is captured in a photographing region 15a and a motion picture following this is captured in photographing regions 15b and 15c. At this time, among the images captured by the camera 10, FIG. 18A is an image corresponding to the photographing region 15a, FIG. 18B is an image corresponding to the photographing region 15b, and FIG. 18C is an image corresponding to the photographing region 15c.

Figure 18A:
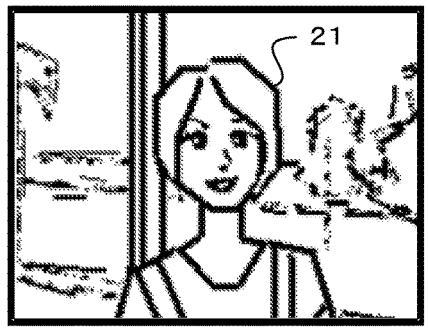
FIGS. 18A to 18F are diagrams showing the way to record and display the center part of the screen as a motion picture even when the orientation of the camera changes after a still image is captured with the camera according to the fourth embodiment of the present invention.
Figure 18D:
Figure 18B:
Figure 18E:
Figure 18C:
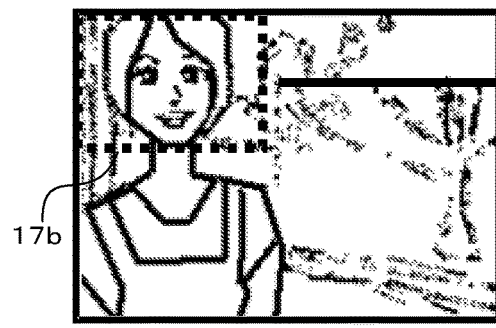
Figure 18F:

The image in FIG. 18A corresponding to the photographing region 15a of the still image is recorded as it is as shown in FIG. 18D. As for the image corresponding to the photographing region 15b of the motion picture, however, a trimming region 17b (the face of the person 21 is in the center) including the screen center of the photographing region 15a is recorded as shown in FIG. 18E. As for the image corresponding to the photographing region 15c of the motion picture, a trimming region 17c including the screen center of the photographing region 15a is recorded as shown in FIG. 18F. Here, the aspect ratios of the trimming regions 17b and 17c may be different from those of the still images, however, if they are the same, uncomfortable feeling can be eliminated, and therefore, in the present embodiment, the same aspect ratio is used.

As described above, even if a photographer changes the compositions to the photographing regions 15a to 15c, the image data in the trimming regions 17b and 17c corresponding to the center part of the screen of the still image is recorded in the recording section 6. Even if a photographer feels easy after photographing a still image and unconsciously changes the compositions to the photographing regions 15*b* and 15*c*, the center part of the screen is trimmed and recorded. By trimming and using only the face part, it is possible to represent a motion picture for capturing the change in facial expression of the subject. That is, as shown in FIGS. 18D to 18F, it is possible to record the history in which the subject comes to have a relaxed facial expression in the transition of images and to recall the memory.

Figure 19:
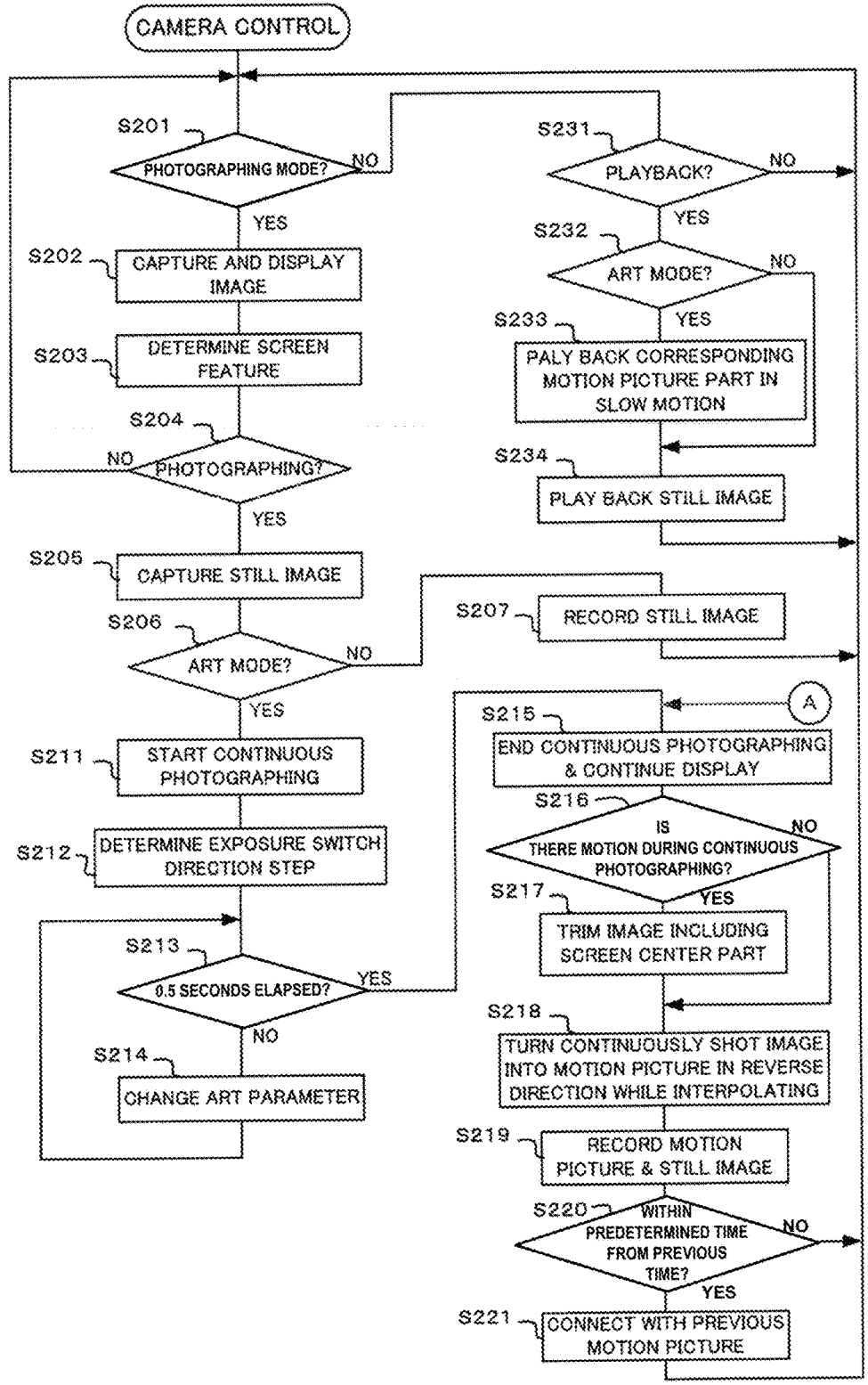
FIG. 19 is a flowchart showing the operation of camera control of the camera according to the fourth embodiment of the present invention.

Next, the operation of the camera 10 according to the present embodiment will be described using the flowchart of camera control shown in FIG. 19. When the camera 10 is powered on and started, the flow shown in FIG. 19 starts. When the flow starts, first, whether or not the mode is the photographing mode is determined (S201). The camera 10 comprises the photographing mode and the playback mode, and the mode state selected by a photographer is determined based on the operation state of the operation section 9.

When the mode is the photographing mode according to the result of the determination in step S201, an image is captured and displayed (S202). In this step, the image data acquired by the imaging section 2 is subjected to image processing in the image processing section 5 and a live view is displayed on the display section 8. It is possible for a photographer to determine a composition and photo opportunity while viewing the live view display.

After the image is captured and displayed, next, the screen features are determined (S203). In the screen feature determination, the face detecting section 2*a* detects whether or not the face part is included in the image and when included, detects the position and size thereof. When the face part is detected, the exposure control values, such as the aperture value and the shutter speed, are calculated so that the part achieves an appropriate exposure, and the automatic focus adjustment is made to focus the part.

After the screen feature determination is made, next, whether or not photographing is performed is determined (S204). Here, whether or not the release button of the operation section 9 is pressed and operated is determined. When photographing is to be performed according to the result of the determination, still image photographing is performed (S205). In this step, the image data output from the imaging section 2 is temporarily recorded in the memory 0 within the temporary recording section 5*a* of the image processing section 5 and at the same time, the image is compressed in the still image compressing section 5*b*.

After the still image photographing is performed, next, whether or not the mode is the art mode is determined (S206). The art mode is set by operating the art mode button of the operation section 9, and therefore, in this step, whether or not the art mode is set by operating the art mode button is determined. When the mode is not the art mode according to the result of the determination, the still image is recorded (S207). In this step, the image data of the still image acquired in step S205 and subjected to image compression processing is recorded in the recording section 6. After the still image is recorded, the process returns to step S201.

When the art mode is set according to the result of the determination in step S206, next, continuous photographing (motion picture) is started (S211). Here, continuous photographing (motion picture) to repeatedly acquire the image data from the imaging section 2 at a predetermined timing is started.

Subsequently, an exposure switch direction step determination is made (S212). When the art parameters are changed, to be described later, the photographing parameters are switched while performing continuous photographing, and at this time, it is necessary to change the aperture as a photographing parameter. In FIG. 14 described above, the example is shown, in which the exposure is shifted toward the overexposure side, however, in a dark scene, there is no room to shift the exposure toward the overexposure side, and in this case, the underexposure side is preferable. In addition to the effect in which an image is overexposed and disappears in light, such an effect may be recommended in which an image is underexposed and disappears in the dark, and emerges again therefrom. Hence, in the exposure switch direction step determination, the direction in which there is a room for exposure is determined and toward which of the overexposure side and the underexposure side the exposure is shifted is determined. Details of the exposure switch direction step determination will be described later using FIG. 22. When the photographing parameters are changed, it may also be possible to switch in accordance with the facial expression of the subject.

After the exposure switch direction step determination is made, next, whether or not 0.5 seconds have elapsed is determined (S213). Here, the time from starting the continuous photographing in step S211 is measured by the clock section 11 and thus whether or not 0.5 seconds have elapsed is determined.

When 0.5 seconds have not elapsed according to the result of the determination in step S213, the art parameters are changed (S214). Here, the photographing parameters are changed while performing continuous photographing. In the present embodiment, a live view is displayed also during the continuous photographing, and therefore, it is possible to confirm the change in captured images accompanying the change of the photographing parameters. However, the change occurs in a brief time, and the change is too fast for the human eyes to notice, and therefore, 0.5 seconds are expanded to two seconds and the change is displayed like a slow motion. Details of the change of the art parameters will be described later using FIG. 20. While changing the art parameters, let 0.5 seconds elapse.

When 0.5 seconds have elapsed according to the result of the determination in step S213, next, the continuous photographing is ended and a continuing display is provided (S215). Because 0.5 seconds have elapsed, the continuous photographing is ended, however, the time is expanded to two seconds in the change of the art parameters in step S214 and the (motion picture of) continuous shooting in the art mode is played back and displayed, and therefore, this playback display is continued.

Subsequently, whether or not there is a motion during the continuous shooting is determined (S216). Whether or not there is such a motion as described in FIG. 17 during the time from starting the continuous photographing in step S211 to ending the continuous photographing in step S215 is determined based on the motion vector in the image processing section 5.

When there is a motion during the continuous shooting according to the result of the determination in step S216, the image is trimmed so that the part located in the center of the screen is centered (S217). Here, as described in FIG. 17, the center of the screen of the still image is trimmed by the trimming section 1*c*. It may also be possible to trim the image so that the face part detected by the face detecting section 2*a* is located in the center instead of the center of the screen.

When the image is trimmed in step S217, or when there is not a motion during the continuous shooting according to the result of the determination in step S216, next, the images continuously shot are edited into a motion picture in the reverse direction while performing interpolation (S218).

Here, as described using FIG. 16, the order of the image data of each frame shot by continuous shooting is reversed in the image processing section 5 and the order of the frames is sorted from the frame shot last in a time-reversed order. At this time, an interpolated image is inserted between each frame and the photographing time of 0.5 seconds is expanded to two seconds.

Subsequently, the motion picture and the still image are recorded (S219). Here, data used to combine the motion picture (continuous shooting, images captured continuously) and the still image is attached by the connection data section 5f (refer to FIG. 13) and the still image and the motion picture as an auxiliary image are recorded in the recording section 6. At this time, information about photographing in the art mode is also attached.

After the motion picture and the still image are recorded, next, whether or not the time having elapsed from the previous recording is within a predetermined time is determined (S220). Here, whether or not the time from completing the previous continuous photographing (S215) to starting the next continuous photographing (S211) is within a predetermined time is determined. When the time is not within a predetermined time according to the result of the determination, the process returns to step S201.

When the time is within a predetermined time according to the result of the determination in step S220, next, connection with the previous motion picture is made (S221). As described using FIG. 15, in preparation for a case where a still image to which a motion picture is attached as an auxiliary image is played back continuously, one file including them is generated in this step. Regarding a predetermined time, when a case is considered, where a motion picture including several images in one hour is created, it may also be possible to connect still images captured within ten minutes.

It may also be possible to change the way of connection in accordance with the transition effect. For example, if a pure white overexposed screen is connected after a deep-black screen, it is not natural, and therefore, after the screen is transitioned to a deep-black one, it may also be possible to display a still image and then connect a motion picture in the forward direction toward overexposures rather than displaying the transition motion picture in the reverse direction from the overexposure side. After the connection with the previous motion picture is made in step S221, the process returns to step S201.

When the mode is not the photographing mode according to the result of the determination in step S201, next, whether or not the mode is the playback mode is determined (S231). The playback mode is set by pressing and operating the playback button of the operation section 9, and therefore, in this step, whether or not the playback mode is set is determined. When the mode is not the playback mode according to the result of the determination, the process returns to step S201.

When the mode is the playback mode according to the result of the determination in step S231, next, whether or not the mode is the art mode is determined (S232). In the recording section 6, not only the image data photographed by the normal still image photographing but also the image data photographed in the art mode is recorded. In this step, whether or not the currently selected image is captured in the art mode is determined based on the information attached to the image data.

When the mode is the art mode according to the result of the determination in step S232, the corresponding motion picture part is played back in a slow motion (S233). In the playback in the art mode, as described using FIG. 16, reverse playback is performed on the display section 8 in a time-reversed order sequentially from the motion picture captured last. At this time, the playback time is lengthened longer than the motion picture photographing time and the motion picture is played back like a slow motion.

When the corresponding motion picture part is played back in a slow motion in step S233, or when the mode is not the art mode according to the result of the determination in step S232, next, a still image is played back (S234). In the case of a normal still image, the image selected in this step is enlarged to be played back and displayed on the display section 8. When the mode is the art mode, the auxiliary motion picture is played back in step S233 (corresponding to the images 26a to 26c in FIG. 16) and in this step S234, the still image (corresponding to the image 26d) is played back as a finished image. When the still image is played back, the process returns to step S201.

Figure 23A:
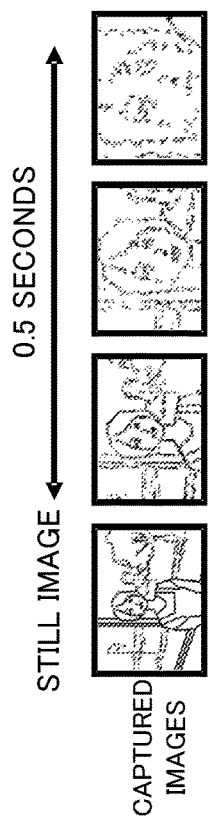
FIGS. 23A and 23B are diagrams showing the way to play back and display a still image and a motion picture continuously captured at the time of photographing with the camera according to the fourth embodiment of the present invention.
Figure 23B:
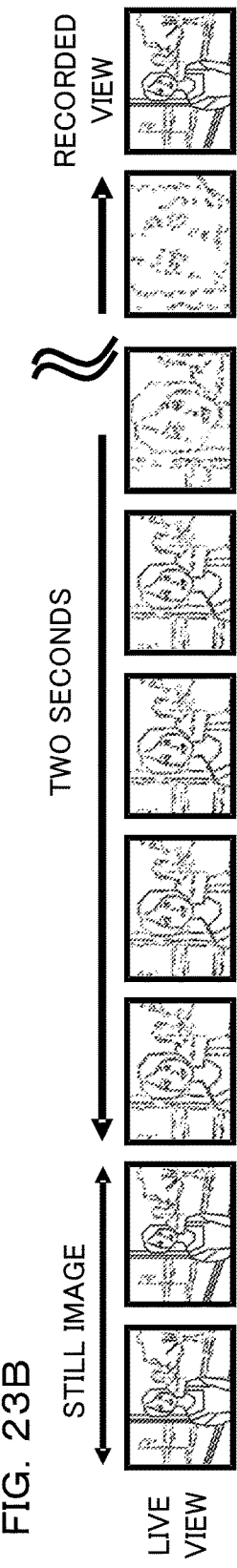

As described above, in the example in the present embodiment, when photographing, immediately after the still image photographing, continuous shooting (motion picture photographing) is performed successively for five seconds as shown in FIG. 23A, and in playback (live view), the continuously shot part (transition motion picture) is lengthened to two seconds and displayed as shown in FIG. 23B. In playback, the same image of the transition motion picture is displayed several times and a display like a slow motion is produced. This is because, in consideration of camera shake of a photographer, the continuous shooting is desirably about 0.5 seconds, however, if it is played back as it is, it is difficult to recognize the image because of its high speed.

Figure 20:
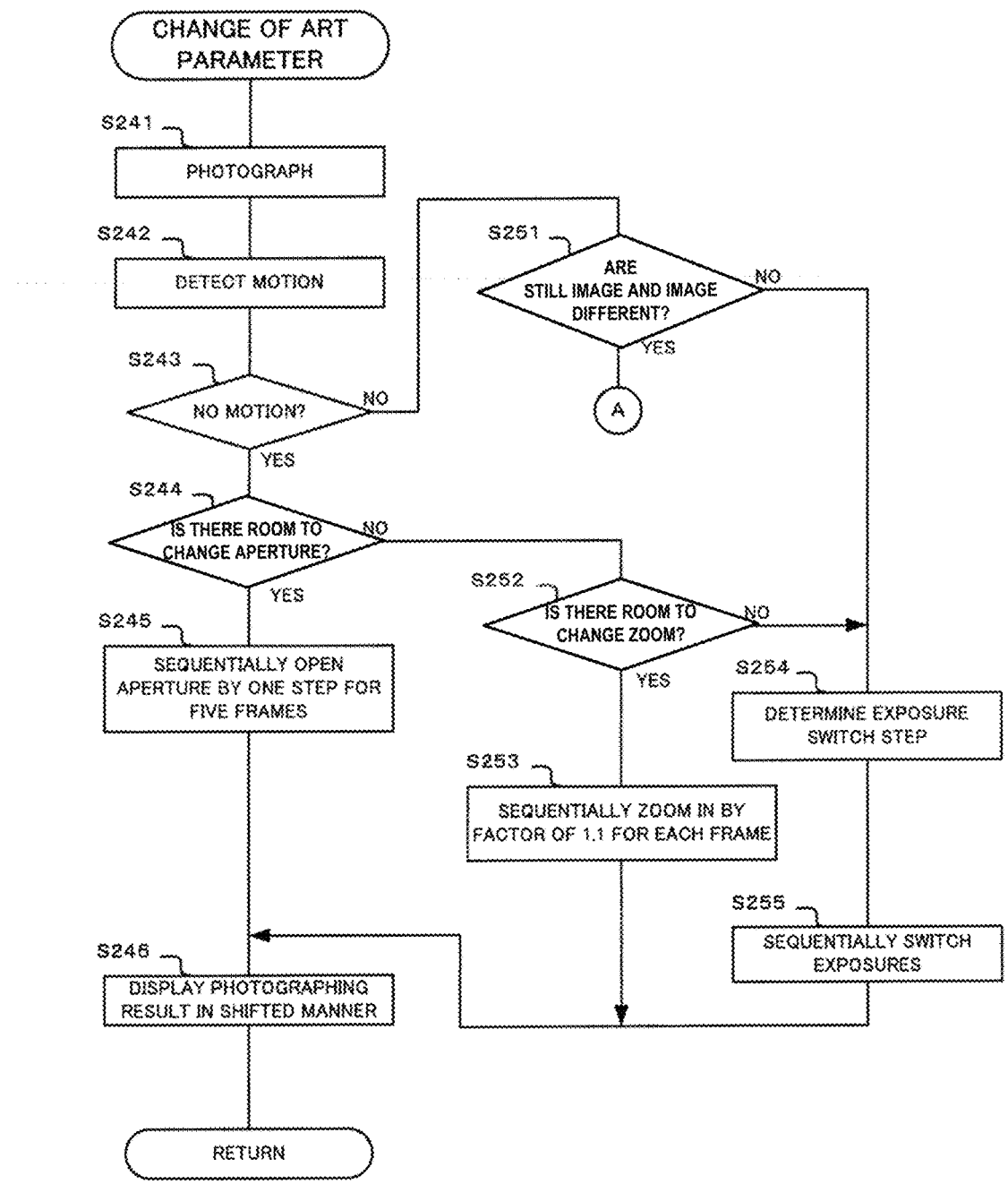
FIG. 20 is a flowchart showing the operation of changing art parameters of the camera according to the fourth embodiment of the present invention.

Next, the subroutine of changing art parameters in step S214 will be described using the flowchart shown in FIG. 20. When the flow of changing art parameters is started, first, photographing is performed (S241). In step S211, continuous photographing is started and in this step, an image of one frame constituting a continuous shot image (motion picture) is captured and the image data obtained at this time is temporarily recorded in any of the memory 1 to memory n of the temporary recording section 5a sequentially.

Subsequently, a motion is detected and whether or not there is a motion is determined (S242, S243). Here, the motion determining section 4 determines whether or not there is camera shake or a change in composition, however, this is not limited and it may also be possible to make the determination based on a motion vector detected by the image processing section 5.

When there is a motion according to the result of the determination in step S243, next, whether or not a still image and an image are different is determined (S251). Here, the determination is made by comparing the still image captured by the still image photographing in step S205 with the image captured by the motion picture photographing in step S241. This is because if the difference between the still image and the motion picture is large, the continuity is impeded and it is not worth while viewing as a series of images. When the image is different from the still image according to the result of the determination in step S251, the process advances to step S215 and the continuous photographing is ended.

When there is not a motion according to the result of the determination in step S243, next, whether or not there is a room to change the aperture is determined (S244). Here, whether or not there is a room to open the aperture toward the fully open side from the currently set aperture value is determined.

When there is a room to change the aperture according to the result of the determination in step S244, next, the aperture is opened in such a way that the aperture is opened by one step for five frames (S245). The exposure is appropriate when a still image is captured, and however, when the aperture is opened gradually, the image gradually becomes an overexposed one. In the present embodiment, the aperture is opened by one step for five frames, however, this is an example, and the way may be changed appropriately. In the present embodiment, photographing of 30 frames per second is supposed, however, in the case of photographing of 60 frames per second, it may also be possible to open the aperture by one step for ten frames, and it may also be possible to appropriately set the number of frames for which the aperture is opened by one step in accordance with other conditions.

When there is not a room to change the aperture according to the result of the determination in step S244, whether or not there is a room to change the zoom is determined (S252). Here, the information about the current focal length of the zoom lens is acquired and then whether or not the focal length can be changed toward the longer focal length side is determined.

When there is a room to change the zoom according to the result of the determination in step S252, next, the focal length is sequentially increased by a factor of 1.1 for each frame (S253). The parameter control section 7 is instructed to increase the focal length by a factor of 1.1 each time it performs step S253. The factor of 1.1 is an example, and when, for example, high-speed continuous shooting is available, the focal length may be increased by a factor of 1.1 for two frames. The factor may be appropriately changed in consideration of the zooming speed, continuous shooting speed, etc.

When there is not a room to change the zoom according to the result of the determination in step S252, or when the still image and the image are not different according to the result of the determination in step S251, next, an exposure switch step is determined from the remaining time (S254). In this case, the exposure correction value is changed as a photographing parameter. A detailed flow of the exposure switch step determination will be described later using FIG. 21.

Subsequently, the exposure is switched to another sequentially in accordance with the exposure correction value determined in step S254 (S255). Here, the aperture, the shutter speed, etc., are changed using an exposure correction value ΔE calculated in step S254.

When the aperture is opened sequentially in step S245, or when zooming in is performed sequentially in step S253, or when the exposure is switched to another sequentially in step S255, next, the images captured by photographing are displayed shifted from one another (S246). As described above, the continuous photographing (motion picture) is performed for 0.5 seconds, however, the time is too brief to recognize the transition effect by changing the photographing parameter, and therefore, a display is produced in a slow motion so that the display time is about two seconds. After the images captured by photographing are shifted, the process returns to the original flow.

Figure 21:
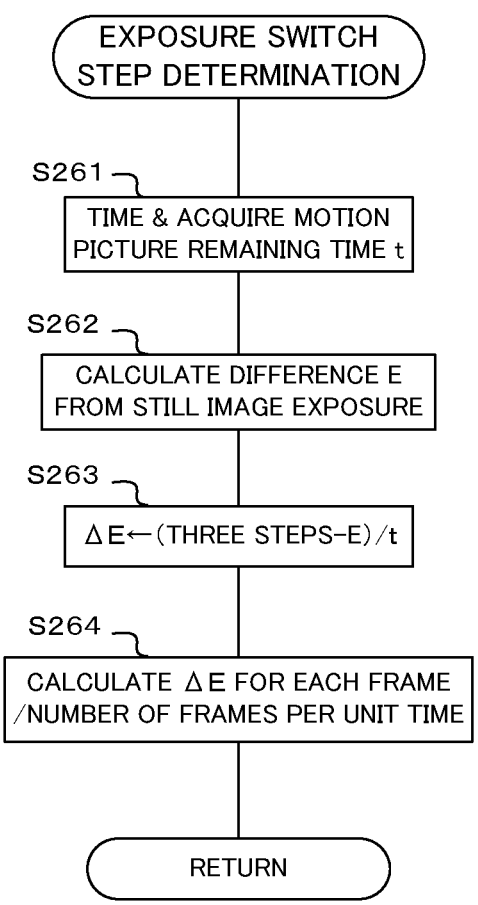
FIG. 21 is a flowchart showing the operation of determining an exposure switch step of the camera according to the fourth embodiment of the present invention.

Next, the subroutine of the exposure switch step determination in step S254 is described using the flowchart shown in FIG. 21. When the flow of the exposure switch step determination is started, first, time is measured and at the same time, a remaining time t of a motion picture is calculated (S261). When continuous photographing is started in step S211, steps S213 and S214 are repeated for 0.5 seconds and in the meantime, image data of frames constituting the motion picture is acquired in step S241. Hence, in step S261, the remaining time t of the motion picture is found by subtracting the time having elapsed from the start of continuous photographing in step S211 from 0.5 seconds.

Subsequently, a difference E from the exposure of the still image is found (S262). Here, the difference E in the amount of exposure shifted from the amount of exposure at the time of the still image photographing in step S205 is calculated. Each time the subroutine of the exposure switch step determination is executed, the exposure is corrected and reduced by the amount of exposure E from that of the still image, and therefore, the reduced amount of exposure E is found here.

After the difference E from the exposure of the still image is found, next, an amount of change in exposure ΔE per unit time is found (S263). The amount of change in exposure ΔE is calculated by (three steps−E)/t. Here, the three steps is an aperture value, E is the difference in the amount of exposure found in step S262, and t is the remaining time of motion picture photographing found in step S261. In the present embodiment, the camera is designed so that when motion picture photographing is ended, the exposure correction by three steps is performed for the still image photographing and in step S263, the amount of change in exposure ΔE per unit time is found with which the exposure correction by three steps is performed when motion picture photographing is ended. Three steps is an example, and different values may be accepted in accordance with various conditions, such as the facial expression.

After the amount of change in exposure ΔE is found, next, an amount of exposure correction for each frame is found (S264). Here, it is found by dividing the amount of change in exposure ΔE for each frame by the number of frames in a unit time. After this calculation, the process returns to the original flow and the exposure is corrected in accordance with the amount of exposure correction ΔE (exposure correction value) for one frame.

Figure 22:
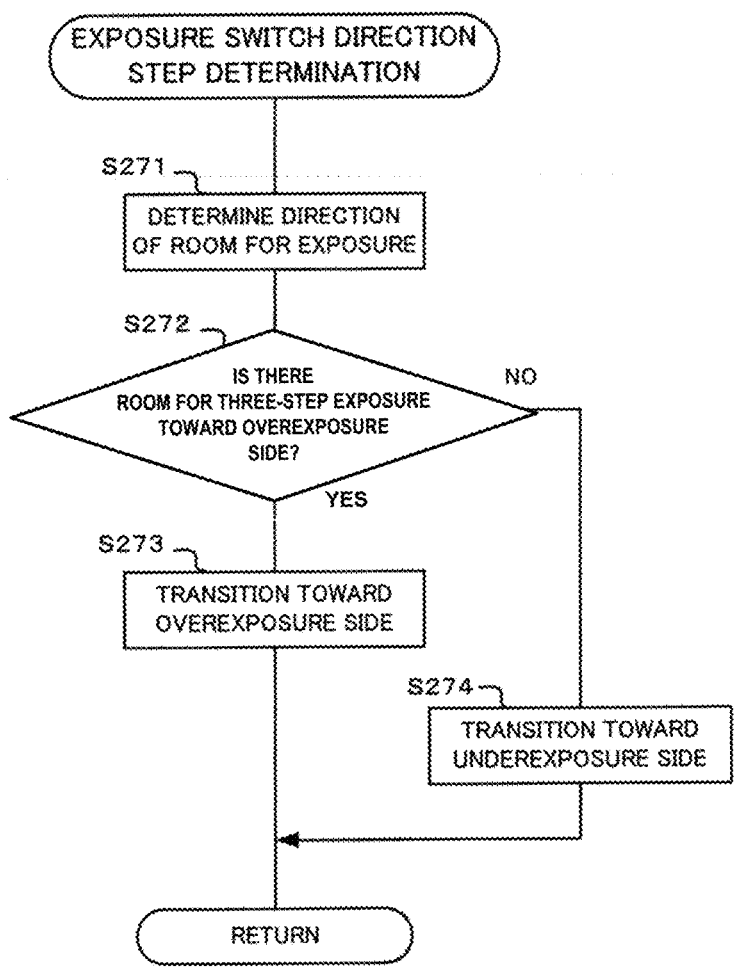
FIG. 22 is a flowchart showing the operation of determining an exposure switch direction step of the camera according to the fourth embodiment of the present invention.

Next, the subroutine of the exposure switch direction step determination in step S212 is described using the flowchart shown in FIG. 22. When the flow of the exposure switch direction step determination is started, first, a direction toward which there is a room to change exposure is determined (S271). Here, whether the exposure can be transitioned toward the overexposure side or toward the underexposure side when the exposure is corrected is determined. In the case of a night scene, the scene is dark originally, and therefore, it is difficult to overexpose the scene to a pure white one even by transitioning the exposure toward the overexposure side because of the exposure limit or sensitivity limit of one frame. Rather than that, the transition in which the darkness deepens is more effective and natural. Hence, toward which side there is a room to change the exposure is determined based on the amount of exposure, which is an appropriate exposure at the time of still image photographing.

After the direction toward which there is a room to change the exposure is determined, next, whether there is a room to change exposure by three steps toward the overexposure side is determined (S272). Here, the determination is made based on the size of the room in step S271. When there is a room to change exposure by three steps toward the overexposure side according to the result of the determination, the exposure is transitioned toward the overexposure side (S273). On the other hand, when there is not a room to change exposure by three steps toward the overexposure side, next, the exposure is transitioned toward the underexposure side (S274).

When the transition toward the overexposure side is made in step S273 or when the transition toward the underexposure side is made in S274, the process returns to the original flow. When the transition toward the overexposure side is made, the amount of exposure correction is shifted toward the overexposure side and when the transition toward the underexposure side is made, the amount of exposure correction is shifted toward the underexposure side.

As described above, in the fourth embodiment of the present invention, when the art mode is set, image data is acquired as a still image and following this, while the photographing parameters are changed to ones different from those at the time of the photographing of the still image, image data is acquired by continuous shooting. Then, the image data of the still image and the continuous shooting acquired here is displayed in a representation different from the time flow with which images are captured by the continuous shooting at a timing in connection with the still image. Hence, it is possible to fuse the still image and the motion picture to capture and play back a varied image.

Further, in the fourth embodiment of the present invention, it is possible to capture an image to which the transition effect is attached, and therefore, it is possible to easily create a motion picture that combines a plurality of cuts that includes no rapid change in scene. Further, it is also possible to record a favorite image, which cannot be represented by a still image, as one image to which the effect of change is attached by changing the angle of view etc.

In the fourth embodiment of the present invention, as the photographing parameters, the aperture value, the focal length (zoom), and the exposure correction value are described, however, these are not limited, and for example, it may also be possible to sequentially switch the focus positions. When switching the focus positions at the time of still image photographing, for example, it may also be possible to gradually switch from the focus position where the main subject is in focus to the position where the background is in focus, or when there is another person other than the main subject, to the position where the other person is in focus. In particular, at the time of still image photographing, there is uncomfortable feeling if the subject is not in focus and it is also difficult to determine framing or a timing to photograph, and therefore, such specifications are reasonable that the photographing parameters are changed after photographing, as described in the fourth embodiment.

If the motion picture captured while changing the photographing parameters is played back in the reverse direction as shown in FIG. 16, a dramatic effect that the subject is becoming in focus can be obtained. The direction in which the focus is adjusted is determined by the focus position of the subject and the limit of focus adjustment of the photographic lens, and when the subject is very near, the focus is adjusted toward the distant side and when snap photographing is performed, the focus is adjusted to the near side, and thus, the amount of blurring becomes large and a vivid effect can be obtained. It may of course be possible to disable such specifications because of the occurrence of a time lag at the time of continuous shooting.

In the fourth embodiment of the present invention, as the photographing parameters, the aperture value, the focal length (zoom), and the exposure correction value are described, however, it is acceptable if two of them or only one of them can be performed when all of the three cannot be performed. In the fourth embodiment of the present invention, the degree of blurring as a photographing parameter is changed by controlling the aperture value, however, it may also be possible to make use of image processing when blurring the background through image processing.

Further, in the fourth embodiment of the present invention, by simply changing the aperture and exposure correction value as the photographing parameters, an overexposure is achieved, however, this is not limited and it may also be possible to change the drive direction of the photographing parameters in accordance with a facial expression. For example, it may also be possible to underexpose when the facial expression becomes gloomy, or to increase the zooming speed when the facial expression becomes cheerful.

Furthermore, in the fourth embodiment of the present invention, continuous shooting (motion picture) is performed for 0.5 seconds and it is expanded to two seconds when played back and displayed, however, these values are examples, and other times may be accepted, of course. However, it is desirable for the time of continuous shooting (motion picture) to be such one which is not affected by any influence of camera shake. Other set values are examples, respectively, and values other than those set values may be accepted.

Still furthermore, in the fourth embodiment of the present invention, the image captured in the art mode is displayed on the display section 8 of the camera 10 immediately after the photographing or at the time of playback. The playback display may be produced, however, by a personal computer, for example, rather than the camera 10. In this case, the image data recorded in the recording section 6 may be played back and displayed as it is, and it may also be possible for the camera 10 not to perform image processing for reverse direction motion picture playback but to cause a personal computer to perform image processing for reversing the motion picture.

Next, a fifth embodiment of the present invention will be described using FIG. 24 to FIG. 29. When starting photographing, a photographing device in the fifth embodiment captures a motion picture while sequentially focusing each subject in an image to be captured and ends photographing after photographing a still image finally. A still image is captured last after a motion picture is captured, and therefore, a varied image can be obtained.

Figure 24:
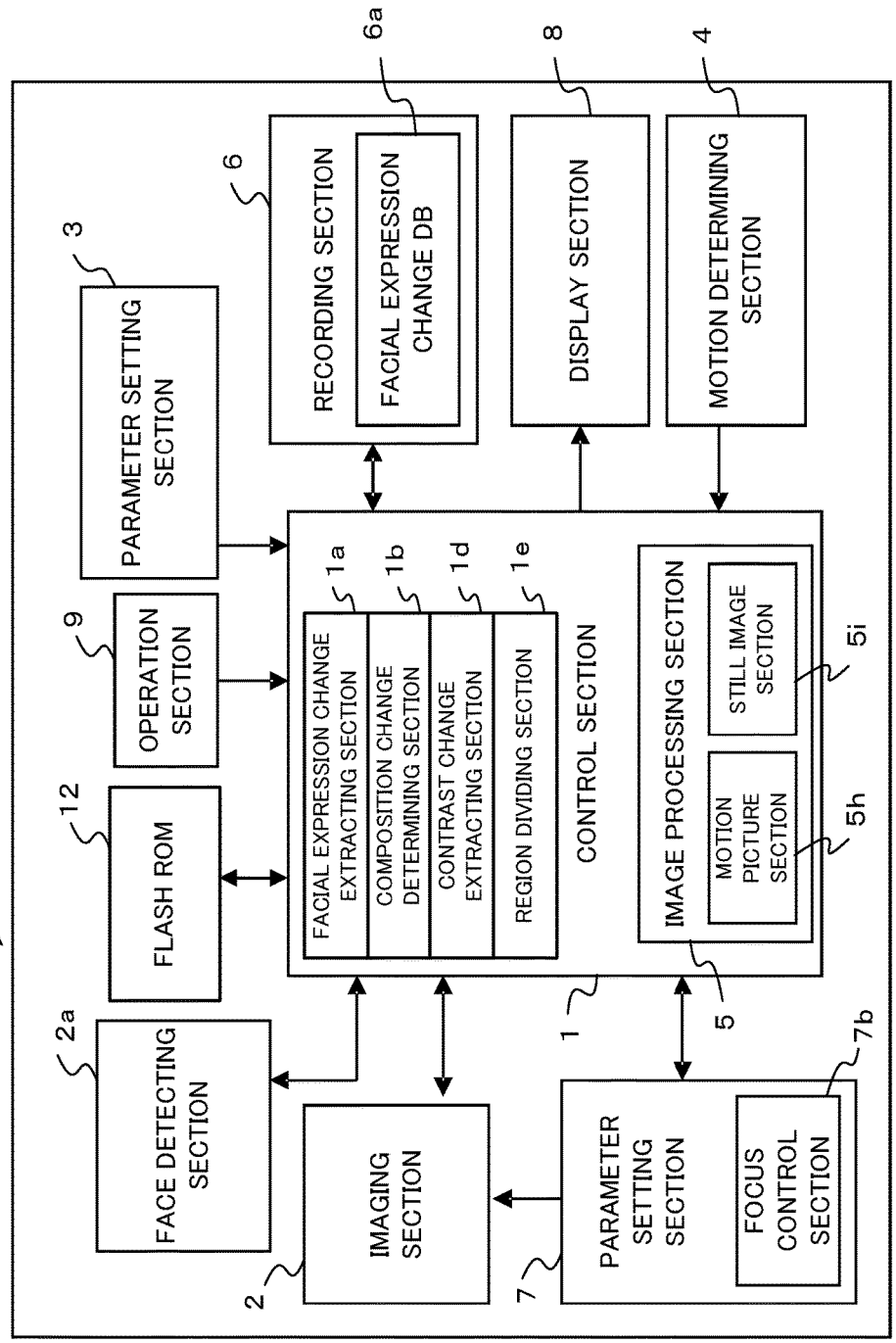
FIG. 24 is a block diagram showing an electrical configuration of a camera according to a fifth embodiment of the present invention.

FIG. 24 is a block diagram showing an electric circuit of the cameral 10 according to the fifth embodiment of the present invention. The camera 10 is a digital camera and includes the control section 1, the imaging section 2, the face detecting section 2a, the parameter setting section 3, the motion determining section 4, the recording section 6, the parameter control section 7, the display section 8, the operation section 9, the flash ROM 12, etc.

Like the imaging section 2 in the first embodiment, the imaging section 2 includes a photographic lens (zoom lens) having a zoom function, an exposure control section, such as a shutter and aperture, an image sensor, a drive circuit and a read circuit of an image sensor, etc., and converts a subject image formed by the photographic lens into image data by the image sensor and outputs the data. Further, the photographic lens of the imaging section 2 includes a focus adjustment lens and its mechanism and in the present embodiment, it is also possible to photograph while shifting a focus by the focus control section 7b, to be described later, when photographing a transition motion picture. Furthermore, an aperture adjustment mechanism for blurring the background may be provided. The face detecting section 2a is the same as that in the first embodiment, and therefore, its detailed description is omitted.

The control section 1 controls the total sequence of the camera 10 in accordance with programs stored in the flash ROM 12. The control section 1 has the facial expression change extracting section 1*a*, the composition change determining section 1*b*, a contrast change extracting section 1*d*, a region dividing section 1*e*, and the image processing section 5. The facial expression change extracting section 1*a* is the same as that in the first embodiment, however, it may also be possible to cause the facial expression change extracting section 1*a* to predict the change in facial expression based on the speed of the change when the facial expression changes when determining the change in facial expression. Further, the composition change determining section 1*b* is the same as that in the first embodiment, and therefore, its detailed description is omitted.

The contrast change extracting section 1*d* extracts a high-frequency component (contrast) from image data output from the imaging section 2 and extracts the change in contrast. As will be described later, it is possible to obtain information about distance to subject by the contrast change extracting section 1*d* detecting a peak value of the change in contrast when scanning the photographic lens.

The region dividing section 1*e* divides the region of the screen based on the information about distance to subject obtained by the above-mentioned contrast change extracting section 1*d*. That is, the image data output from the imaging section 2 is divided into the form of a mesh and information about distance to subject is obtained at each point, and thus, it is possible to divide the screen region into each point having substantially the same distance to subject. The region division by the region dividing section 1*e* will be described later using FIGS. 27A to 27C.

The image processing section 5 in the control section 1 has the motion picture section 5*h* and the still image section 5*i*, takes in image data output from the imaging section 2, performs various kinds of image processing, such as thinning processing, trimming processing, edge enhancement, color correction, and image compression, and performs image processing for displaying a live view of a motion picture, for recording a still image and a motion picture in the recording section 6, for playing back and displaying a still image and a motion picture, etc. For compression/decompression of an image etc., the image processing section 5 has circuits for a still image and a motion picture in accordance with each processing, such as a still image compressing/decompressing circuit and a motion picture compressing/decompressing circuit. Further, it is possible for the image processing section 5 to acquire color information and a motion vector based on image data.

The parameter control section 7 has the focus control section 7*b*. The focus control section 7*b* adjusts the focus position of the photographic lens of the imaging section 2 so that the contrast information detected by the contrast change extracting section 1*d* is indicative of the peak position. That is, a so-called automatic focus adjustment by contrast method is made. In the art motion picture mode, as will be described later, the focus adjustment of the photographic lens is made so that the focus moves from the secondary subject to the main subject.

The operation section 9 includes various operation members, such as the release button, the power switch, the playback mode setting button, and the menu button, and determines the operation state of these operation members and sends the determination result to the control section 1. The control section 1 described above controls photographing and playback in a predetermined sequence in accordance with the operation state of the operation member.

Like the display section 8 in the first embodiment, the display section 8 has a display section, such as a liquid crystal panel and an organic EL panel, disposed on the backside etc. of the camera 10 and produces a display of a live view before photographing, a display of normal playback of a recorded image, a display of camera information, etc. It is possible for a photographer to determine a composition and timing by observing the live view display. Further, the display section 8 in the present embodiment also plays back and displays a transition image obtained in the art motion picture mode, that is, by capturing a motion picture while moving the focus and finally photographing a still image.

The parameter setting section 3, the parameter control section 7, the motion determining section 4, the recording section 6, the facial expression change DB 6*a*, and the flash ROM 12 are the same as the parameter setting section etc. in the first embodiment, and therefore, their detailed description is omitted.

Figure 25A:
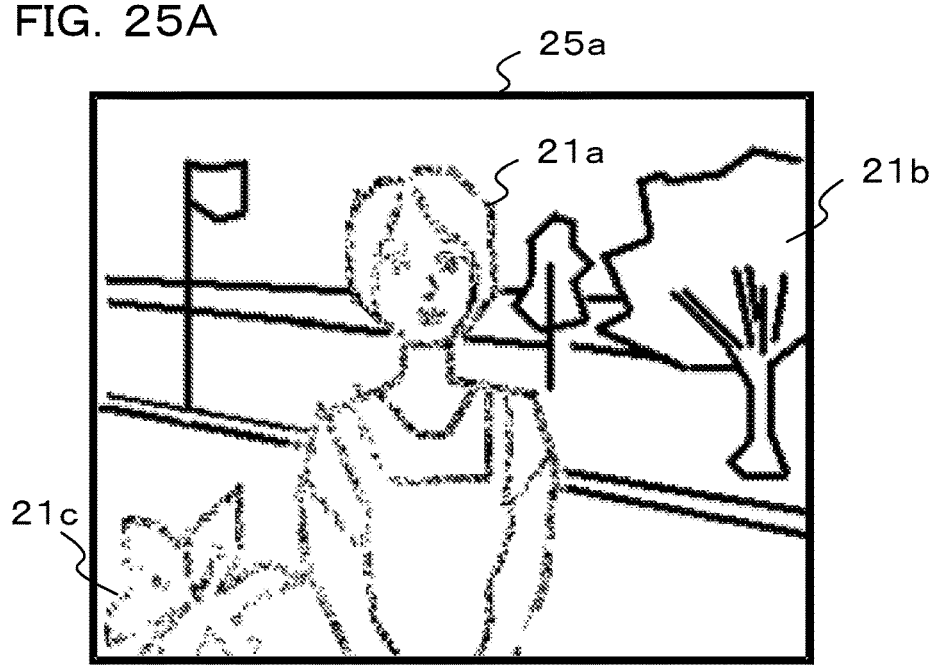
FIGS. 25A and 25B are diagrams showing an image when photographing is performed in an art motion picture mode with the camera according to the fifth embodiment of the present invention, particularly, FIG. 25A showing an image when photographing starts and FIG. 25B an image when photographing ends.
Figure 25B:
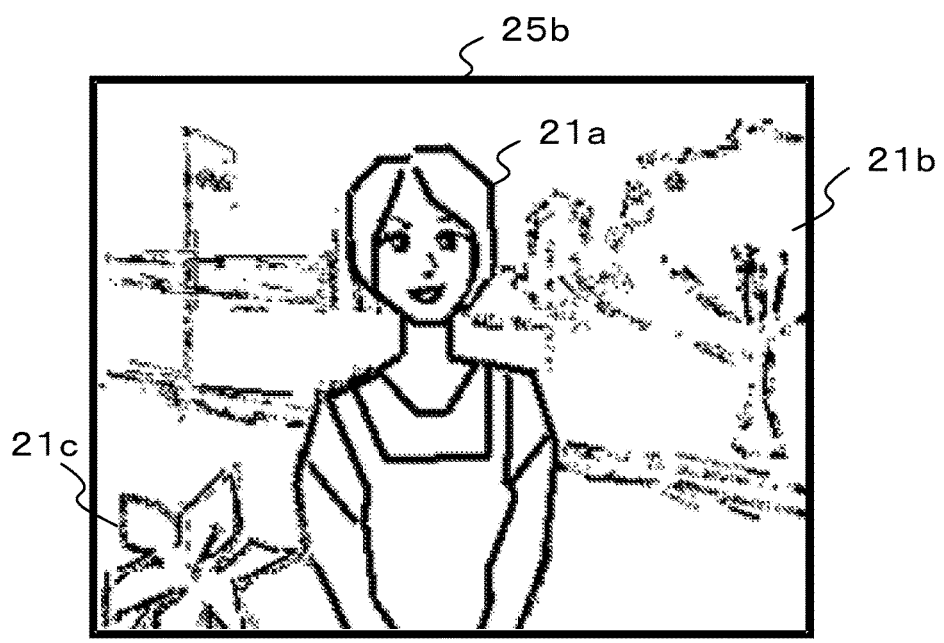
Figure 26:
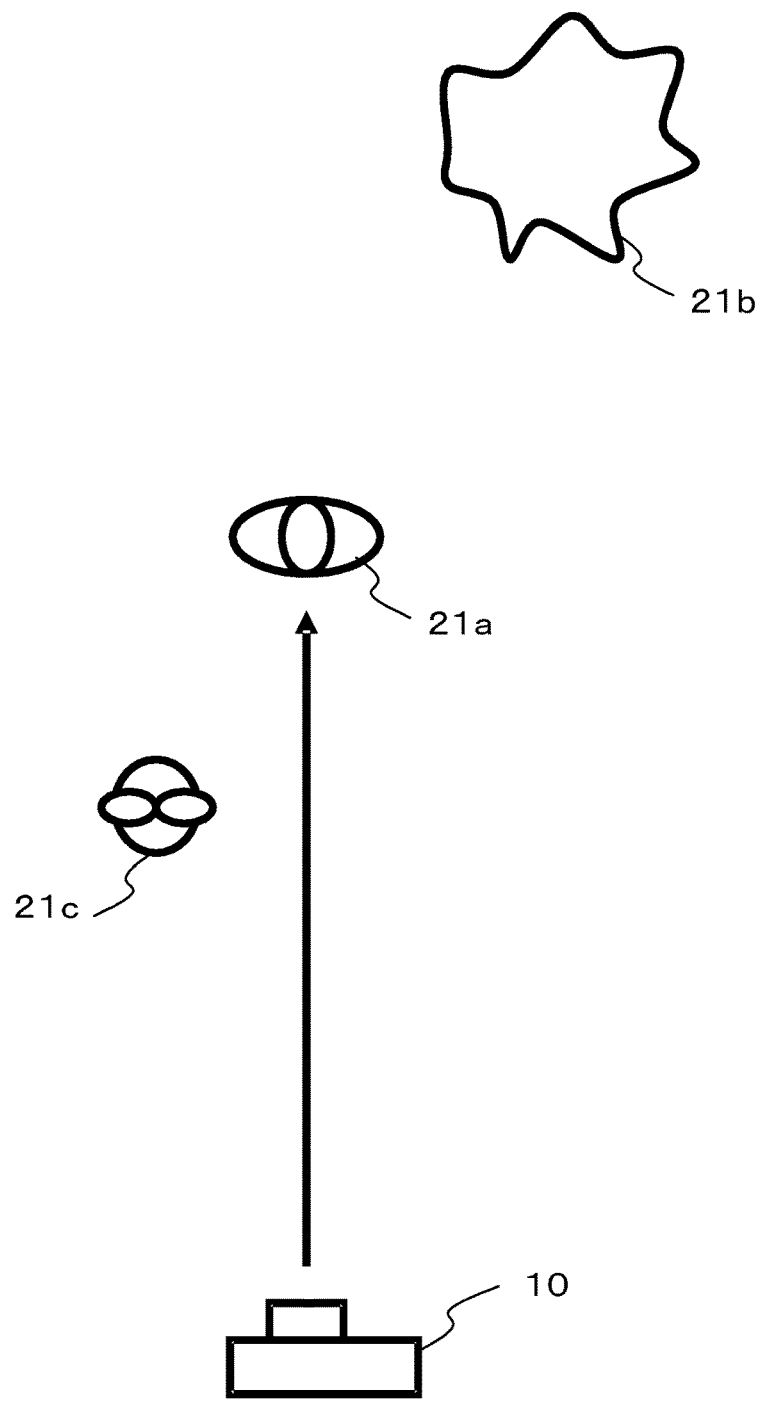
FIG. 26 is a diagram showing a positional relationship between camera and subject with the camera according to the fifth embodiment of the present invention.

Next, the photographing in the art motion picture mode by the camera 10 according to the present embodiment is described using FIG. 25A, FIG. 25B and FIG. 26. The art motion picture mode is a mode in which a distance to a subject etc. in the screen is measured when photographing and if there is another distance to a different subject, a main subject and a secondary subject are selected and the focus is moved from the selected secondary subject to the selected main subject, and a motion picture is captured during the movement of the focus and finally the main subject is photographed in a still image.

As shown in FIG. 26, it is assumed that a person 21*a*, as a main subject, is substantially in the center of the screen and there is a flower 21*c* on the near distance side and a tree 21*b*, as a secondary subject, in the background (on the long distance side). When photographing is performed in the art motion picture mode in such a layout, an image 25*a* is obtained first, in which the tree 21*b* in the background is in focus as shown in FIG. 25A and then, the focus position moves gradually toward the person 21*a* and in the meantime, image data is recorded in a motion picture. Then, an image 25*b* in which the person 21*a* is in focus as shown in FIG. 25B is obtained finally, and image data is recorded as a still image. This is an effective method to indicate what is present in the background in a pretty image (refer to FIG. 25B) in which the background is blurred. It is desirable to focus the main subject (the person 21*a* in the example in FIG. 25B) in the final image and this image is recorded as a still image.

As described above, in the art motion picture mode in the present embodiment, image transition is performed, and in the transition from FIG. 25A to FIG. 25B, the image is changed smoothly and as the image 25*a* in FIG. 25A and the image 25*b* in FIG. 25B, different images the difference between which can be recognized at a glance are selected. In the image transition, if the focus position is moved back and forth repeatedly, a viewer will be displeased, and therefore, such a movement of the focus should be avoided, in which, for example, the focus is moved from the flower 21*c* to the person 21*a*, then the tree 21*b* is focused, and then the person 21*a* is focused again.

Consequently, it is necessary to select a secondary subject and a main subject as a start point and an end point of the image transition. Either of the main subject and the secondary subject may be selected as the start point, however, in the present embodiment, the transition starts from the secondary subject and ends at the main subject because a completed still image is to be obtained finally. As a method of selecting a main subject and a secondary subject, there can be conceived of various methods, and in the present embodiment, a combination that exhibits the effect of focusing remarkably is preferred.

Figure 27A:
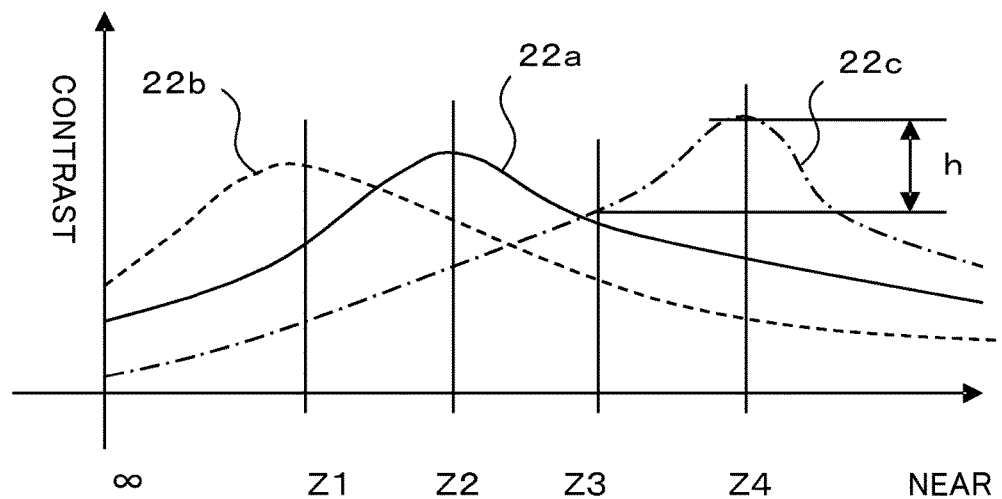
FIGS. 27A to 27C are diagrams showing focus adjustment and region division with the camera according to the fifth embodiment of the present invention, particularly, FIG. 27A being a graph representing a relationship between distance to subject and contrast, FIG. 27B showing an image of a subject, and FIG. 27C being a diagram showing a divided image region.
Figure 27B:
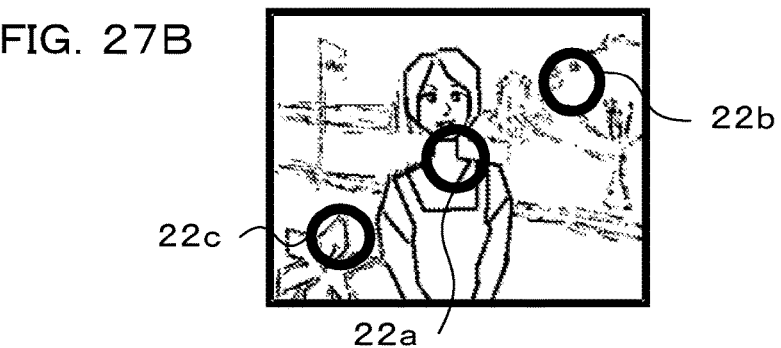
Figure 27C:
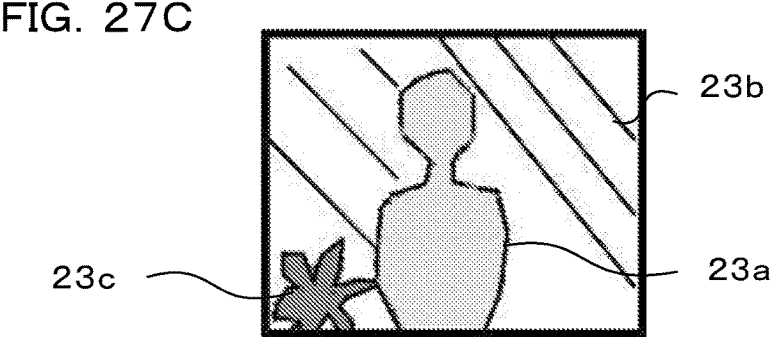

Next, the selection of the main subject and the secondary subject is described using FIGS. 27A to 27C. FIG. 27A is a graph showing a relationship between distance to subject and contrast, FIG. 27B shows an image of the subject, and FIG. 27C shows divided image regions. As described above, in the present embodiment, information about distance to subject is acquired from the peak position of the contrast when the photographic lens is scanned. The photographic lens can be scanned from the nearest end to the infinite end, however, it takes time to scan the entire region, and therefore, in the present embodiment, only part of the region is scanned and other regions are scanned at another timing or inferred. It may also be possible to make use of information about distance of focusing by the contrast method when displaying a live view.

In the example shown in FIGS. 27A to 27C, for the focus adjustment of the photographic lens, the photographic lens is scanned at a plurality of points $22a$, $22b$ and $22c$ in the screen as shown in FIG. 27B and thus the contrast is measured. The changes in contrast at each of the points $22a$, $22b$ and $22c$ are represented by curves as shown in FIG. 27A. As described above, the photographic lens is not scanned over the entire region but in the range of focus positions Z1, Z2 and Z3 in the example shown in FIG. 27A.

As can be seen from FIG. 27A, the contrast curve $22a$ corresponding to the person $21a$ has its peak at the focus position Z2, the contrast curve $22b$ corresponding to the flower $21b$ has its peak on the more distant side of the focus position Z2, and the contrast curve $22c$ corresponding to the tree $21c$ has its peak on the nearer side of the focus position Z2.

In the example shown in FIGS. 27A and 27B, the contrast is measured at only the three points for the convenience of explanation, however, if the contrast at more points of a more finer mesh is acquired and the change in contrast and information about contour are obtained, it is possible to divide the screen into individual regions in accordance with a subject as shown in FIG. 27C. In the example shown in FIG. 27C, the screen is roughly divided into a region $23a$ in which the person $21a$ is present, a region $23c$ before the region $23a$, in which the flower $21c$ is located, and a background region $23b$ in which the tree $21b$ is included.

When the screen is divided into each region, various pieces of information can be obtained for each region, such as whether a face is included, which region is wide, color components included in each region, and whether or not there is motion. By using these pieces of information, it is possible to determine which region is an important region, and therefore, to determine regions that include the main subject and the secondary subject described above. Further, when measuring the contrast while moving the focus position of the photographic lens after measuring the contrast between the focus positions Z1 to Z3 and dividing the screen into each region, if the contrast changes rapidly between the focus position Z3 and a focus position Z4, it is possible to modify the region and make use of the region in the determination as to whether the region is an important region by referring to an amount of change in contrast h and a width of change from the focus position Z2 where the face of the person $21a$ is focused at this time.

When there is a subject with high contrast (in the example in FIG. 27B, the tree $21b$ at the focus position Z4) at a position different from the focus position of the face (in the example in FIG. 27B, the focus position Z2), it is effective when the effect of focus shift is represented in a motion picture, and therefore, in the present embodiment, information about contrast in the position where the focus changes is attached importance. This is because when the change in focus is small, the effect of focus shift is small and there is a possibility that a viewer does not notice it.

Selection of a main subject and a secondary subject is determined based on weight values by weighting the divided regions, respectively, described in FIG. 27C. FIG. 28 shows weight values. When assigning weights, first, Za for determining a main subject is weighted. When weighting Za, whether or not the conditions shown in FIG. 28 are satisfied is determined for each of the regions $23a$ to $23c$.

For example, as to the first condition that "face with the upper half of the body", whether or not the region $23a$ satisfies the condition is determined. In the example shown in FIG. 27B, the person $21a$ in the region $23a$ has the face with the upper half of the body, and therefore, a weight of 10 points is assigned. On the other hand, in the regions $23b$ and $23c$, there is no face with the upper half of the body, and therefore, a weight of zero point is assigned. Whether or not there is a face is determined by the face detecting section $2a$ and whether or not the face is one with the upper half of the body is determined by the image processing section 5. It may also be possible to change the degree of priority based on not only the size of a face but also the facial expression of the face. A face with an unnaturally large size, a face in profile, etc., are given a low degree of priority, however, no explanation is given here for the sake of simplification of the explanation.

The third weighting condition that whether or not "there is a motion" in FIG. 28 is determined by the image processing section 5 determining a motion vector. A subject in motion attracts attention of a viewer, and therefore, a weight of five points is assigned. The fourth weighting condition is that whether or not "there is a change in color" and this is determined by the image processing section 5 determining whether or not a number of colors are included in the region. This is because when a number of colors are included, the region attracts attention of a viewer.

The fifth and sixth weighting conditions relate to the size of the region area and are determined by the image processing section 5. When the area is large, it is considered that the region includes an important subject. The eighth weighting condition is that whether or not "screen center part" and this is determined by the image processing section 5. When a subject is in the screen center, this is done intentionally by a photographer in most cases and it can be considered that the subject is important.

As described above, the conditions are determined for each of the regions $23a$ to $23c$ and weight is assigned based on the determination result, the total of the points assigned is calculated, and then the region with the largest total value is determined to be the region Za in which the main subject is present. In the example shown in FIG. 27B, the region $23a$ in which the person $21a$ is included is the region Za. When selecting the region Za, the conditions shown in FIG. 28 are examples, and part of the conditions shown in FIG. 28 may be employed or other conditions may be added thereto.

When the region Za where the main subject is present is determined, next, the region Zb where the secondary subject is present is determined. When selecting the secondary subject, the values in either of the columns as shown in FIG. 28 are used depending on whether or not a face is included in the image. Consequently, first, whether or not a face is included in the image is determined and a table to be used is determined. Subsequently, as to the regions other than the region where the main subject is included, whether or not each condition is satisfied is determined as in the case of the main subject and when a certain condition is satisfied, the point described in FIG. 28 is assigned and the region with the largest total value is determined to be the region Zb where the secondary subject is present.

As the conditions used in determining the region Zb where the secondary subject is present, the following conditions are added to the conditions for the main subject. That is, as the seventh weighting condition, whether or not "brighter than Za part" is determined. When the region Zb is brighter than the region Za of the main subject, this attracts attention of a viewer and the degree of importance can be thought high. Further, as the ninth weighting condition, whether or not "contrast is higher than face part" is determined. When the contrast is higher than the contrast of the face part in the image, there is a possibility that the degree of importance is high.

Furthermore, as the tenth weighting condition, whether or not "focus is distant from focus position" is determined. This is the case where the focus position is more than a predetermined distance apart from the main subject and in such a case, the effect of the focus shift turns out remarkably. This is important in selecting the secondary subject, and therefore, as high a point as seven is set in the present embodiment. In selecting the region Zb, the conditions shown in FIG. 28 are examples, and part of the conditions shown in FIG. 28 may be employed or other conditions may be added thereto.

Figure 29:
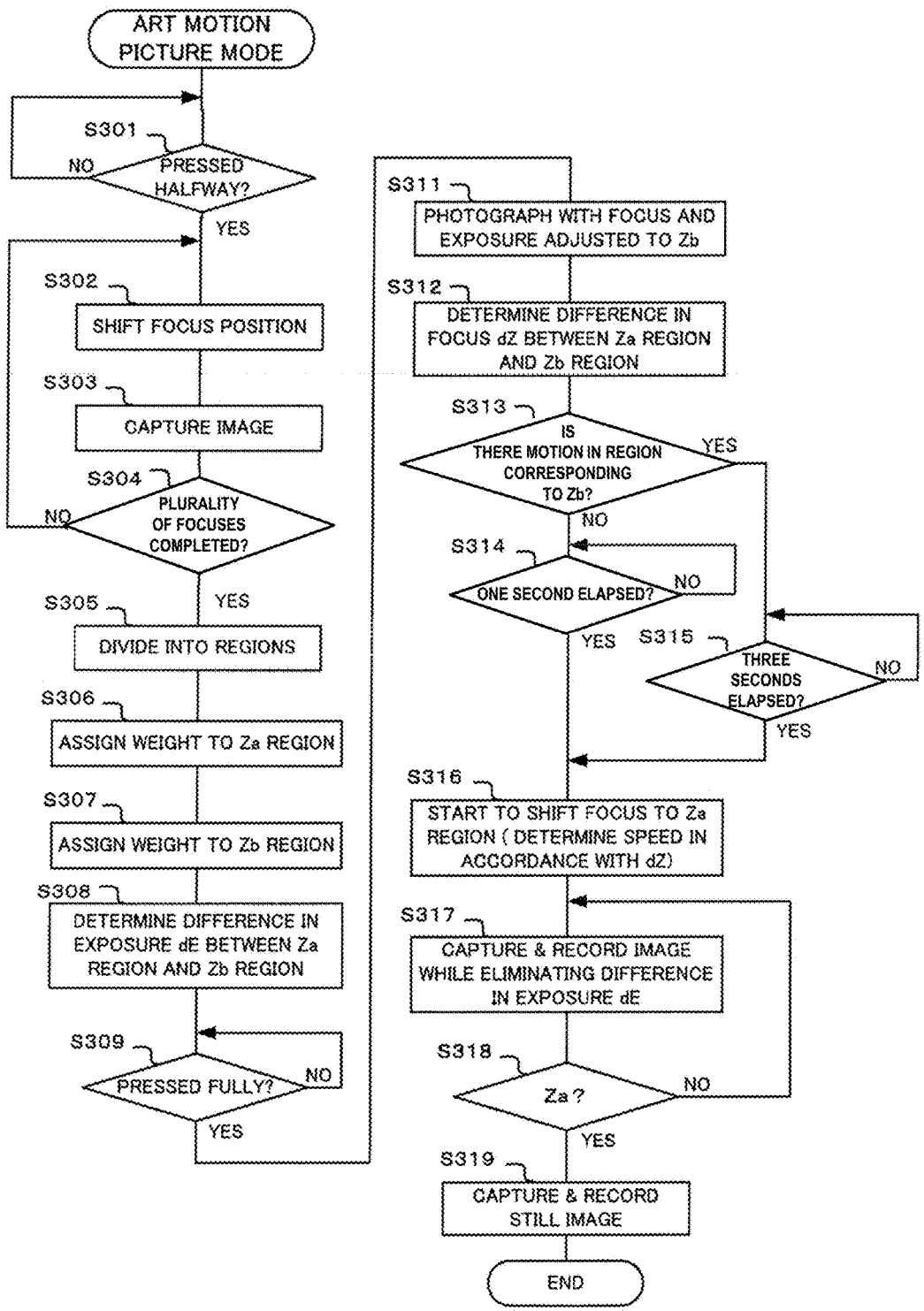
FIG. 29 is a flowchart showing the operation of an art motion picture mode of the camera according to the fifth embodiment of the present invention.

Next, the operation of the camera 10 in the present embodiment is described using the flowchart of the art motion picture mode shown in FIG. 29. The camera 10 can operate in various modes, however, for simplicity, in this flowchart, only the art motion picture mode is described and other modes are omitted. For the setting of the art motion picture mode, it may also be possible to provide a dedicated operation button for setting the art operation mode, or use a menu screen for setting. Further, it may also be possible to design the camera 10 so that the art operation mode is set as a default value, or the camera 10 may be one exclusive for the art operation mode.

The flowchart shown in FIG. 29 is executed by the control section 1 in accordance with the programs stored in the camera 10. When the flow of the art operation mode is started, first, whether or not the release button is pressed halfway is determined (S301). Here, whether or not the release button of the operation section 9 is in the halfway-pressed state is determined. If not, let time elapse until the halfway-pressed state is brought about while displaying a live view on the display section 8.

When the release button is in the halfway-pressed state according to the result of the determination in step S301, the focus position is shifted (S302). Here, for example, the photographic lens is scanned between Z1 and Z3 in FIG. 27. When the power switch is turned on, the camera 10 starts to display a live view and in the meantime, the focus is adjusted and the contrast of a subject image is monitored real time, and when the contrast changes, the focus is adjusted again. When the focus position is shifted in step S302, the range of Z1 to Z3 is determined using information about focus adjustment made when a live view is displayed.

Subsequently, an image is captured (S303). In step S302, the scanning of the photographic lens is started and while scanning, the contrast is acquired by the contrast change extracting section 1d using the image data from the imaging section 2 and information about distance to subject at each point is acquired.

Next, whether or not the measurement of a plurality of focuses is completed is determined (S304). Here, as described using FIG. 27, the contrast is acquired for all of the points in the screen and whether the collection of information about distance to subject is completed is determined. When the collection is not completed according to the result of the determination, the process returns to step S302.

When the measurement of the plurality of focuses is completed according to the result of the determination in step S304, next, the screen is divided (S305). Here, as described in FIG. 27C, the region of the entire screen is divided in accordance with the subject based on the information about distance to subject etc.

When the region is divided, next, weighting of the region Za is performed (S306). Here, as described in FIG. 28, in order to select a main subject, the determination of region weighting is made for each region divided in step S305 and the region with the largest total value is selected as the Za region.

When the weighting of the region Za is performed, next, weighting of the region Zb is performed (S307). Here, as described in FIG. 28, in order to select a secondary subject, the determination of region weighting is performed for each region divided in step S305 and the region with the largest total value is selected as the Zb region.

When the weighting of the region Zb is performed, next, a difference in exposure dE between the Za region and the Zb region is determined (S308). Here, as to the Za region acquired in step S306 and the Zb region acquired in step S307, the luminance of the region is acquired using image data of each region and the difference in appropriate amount of exposure dE is calculated using the luminance.

When the difference in exposure dE is found, next, whether or not the release button is pressed fully is determined (S309). Here, whether or not the release button of the operation section 9 is in the fully-pressed state is determined. Let time elapse until the fully-pressed state is brought about and when the fully-pressed state is brought about, next, the focus and exposure are adjusted to the Zb region and photographing is performed (S311). The Zb region is the region of the secondary subject, and first, the focus and exposure are adjusted to this region. The state in this step S311 is the state of the image 25a illustrated in FIG. 25A and in this case, the state is such one where the focus and exposure are adjusted to the tree 21b in the background.

Subsequently, a difference in focus dZ between the Za region and the Zb region is determined (S312). Here, the difference in focus dZ is found, which corresponds to a difference between information about distance to the main subject and information about distance to the secondary subject. The difference in focus dZ is used in step S316.

When the difference in focus dZ is determined, next, whether or not there is a motion in the Zb region is determined (S313). Here, whether there is something that moves in the region where the secondary subject is present is determined based on the motion vector of the image data.

When there is not a motion according to the result of the determination in step S313, let time elapse (S314). On the other hand, when there is a motion, let three seconds elapse. When there is a motion, a viewer desires to confirm what is the moving subject in many cases and hence, the waiting time is set long. One second and three seconds are examples, and the waiting time may be changed appropriately in consideration of the preferences of a photographer and a viewer.

After letting a predetermined time elapse in step S314 or S315, next, the focus shift is started toward the Za region and in this case, a speed in accordance with the difference in focus dZ is determined (S316). As described above, after the secondary subject is focused, the focus is moved toward the main subject and at this time, the moving speed is set to a value in accordance with the difference in focus dZ. Here, the focus is moved from the secondary subject to the main subject in a fixed time regardless of the difference in focus dZ. As a fixed time, for example, about three seconds are set, however, this may be changed appropriately in consideration of the preferences of a photographer and a viewer.

Subsequently, an image is captured and recorded while eliminating the difference in exposure dE (S317). In step S308, the difference in exposure dE is found and exposure is controlled so that an appropriate exposure is maintained in consideration of the difference in exposure dE during the focus shift. In order to control the exposure, the aperture value, the shutter speed, the ISO sensitivity, etc., are controlled. At this time, while the image data from the imaging section 2 is being subjected to image processing for a motion picture in the image processing section 5, the image data is recorded in the recording section 6 as a motion picture.

Next, whether or not the Za region is reached is determined (S318). The Za region is a region where the main subject is present and whether or not the focus position of the photographic lens reaches the region is determined. When the Za region is not reached according to the result of the determination, the process returns to step S317 and an image is captured and recorded while eliminating the difference in exposure dE.

On the other hand, when the Za region is reached according to the result of the determination in step S317, a still image is captured and recorded (S319). The Za region is the region of the main subject and when this region is reached, the image data from the imaging section 2 is subjected to image processing for a still image by the image processing section 5 and the image data of the still image is recorded. The state in step S319 corresponds to the image 25b illustrated in FIG. 25B and in this case, the state is one where the person 21a is in focus. Because the exposure control is changed so that the difference in exposure dE is eliminated, an appropriate exposure is achieved also for the still image. It may also be possible to shoot the still image after the movement of focus shift stops in the Za region. After the image data of the still image is recorded, the art motion picture mode is completed.

In the flowchart shown in FIG. 29, when the release button is pressed fully according to the result of the determination in step S309, photographing is started after the focus is shifted to the Zb region. However, the focus is adjusted to the Zb region from the state where the Za region is in focus, and therefore, a time lag occurs corresponding to the time required for focus adjustment. Hence, there is a possibility that photo opportunity is lost, and therefore, the level of emergency is determined based on the impact when the button is pressed fully etc. When the level of emergency is high, it may also be possible to perform still image photographing in the Za region first and then perform the motion picture photographing while shifting focus toward the Zb region.

As described above, in the fifth embodiment of the present invention, the screen is divided into a plurality of regions in accordance with the subject and a region from which the focus is moved is determined from the plurality of regions and the focus is moved by the focus control section. Hence, it is possible to capture a varied image without the need of a photographer to perform a manual operation intentionally. Further, the focus control section is configured to record image data of a motion picture when moving the focus, and therefore, it is possible to easily perform motion picture photographing.

Further, in the fifth embodiment of the present invention, the focus control section performs motion picture photographing while moving the focus and performs still image photographing when the target focus position is reached. Hence, it is possible to easily capture a varied image that fuses a motion picture and a still image together. The motion picture obtained by such photographing exhibits a very significant effect without the presence of the still image and will serve as an effective raw material when only the motion picture parts are connected and edited.

Furthermore, in the fifth embodiment of the present invention, when the subject image includes the main subject and first and second image parts other than the main subject, the direction of the movement of the focus is determined using the difference in focus between the main subject and the first image part and the difference in focus between the main subject and the second image part. Specifically, when determining the secondary subject, the fact that the focus is apart from the position of focus adjustment (10) in FIG. 28 is taken into consideration. Hence, the effect of focus shift turns out remarkably and a varied image is obtained.

In the fifth embodiment of the present invention, when information about distance to subject is acquired, the contrast method is used, in which the high-frequency component of image data is extracted, however, this is not limited and other ranging methods may be used. For example, a difference in phase AF may be employed and in this case, it is no longer necessary to scan the photographic lens.

Further, in the fifth embodiment of the present invention, when the screen is divided, information about distance to subject is used, however, this is not limited and other methods may be used. For example, it may also be possible to analyze the image and extract the contour, then, divide the screen based on the contour.

Furthermore, in each of the embodiments of the present invention described above, explanation is given using a digital camera as a device for photographing, however, the camera may be a digital single-lens reflex camera or a compact digital camera, a camera for motion picture photographing, such as a video camera and a movie camera, or a camera incorporated in a mobile telephone, personal digital assist (PDA) terminal, gaming machine, etc.

The present invention is not limited to the above-mentioned embodiments as they are but can be embodied by modifying components without deviating from the scope of the gist in the embodiment stage. Further, it is also possible to form various inventions by appropriately combining the plurality of components disclosed in the above-mentioned embodiments. For example, it may also be possible to delete some components of the entire components shown in the embodiments. Furthermore, it may also be possible to appropriately combine the components across the different embodiments.

What is claimed is:

1. Apparatus comprising:
   a) a display;
   b) a recording medium storing a mode state; and
   c) a control section controlling playback of image data stored in the recording section by
      1) determining, from the stored mode state, whether or not the playback mode is of a first type or a second type, and 2) responsive to a determination that the playback mode is of the first type, controlling the display to playback still image data, and otherwise, responsive to a determination that the playback mode is of the second type, controlling the display to playback both still image data and moving image data, wherein the moving image data was previously connected with the still image data during a photography operation, and wherein the still image data was captured separately from the moving image data.

2. The apparatus of claim 1 wherein the playback mode of the second type is an art mode.

3. The apparatus of claim 1 further comprising:
d) an operation section for receiving user input,
wherein the mode state stored by the recording section is based on user input that was received via the operation section.

4. The apparatus of claim 1 wherein the moving image data includes at least one of a transition effect and a blurring transition effect.

5. The apparatus of claim 1 wherein a frame rate of the moving image data played back is lower than a normal frame rate.

6. The apparatus of claim 1 wherein the still image data and the moving image data captured separately, were captured responsive to a single user operation.

7. The apparatus of claim 1 wherein the still image data and the moving image data were captured in a first sequence, and responsive to the determination that the playback mode is of the second type, controlling the display to playback both the still image data and the moving image data in a second sequence that is different from the first sequence.

8. Apparatus comprising:
a) a display; and
b) a control section controlling playback of a stored still image data by
1) determining whether or not the stored still image data has connected moving image data, and
2) responsive to a determination that the stored still image data does not have connected moving image data, controlling the display to playback the still image data, and otherwise, responsive to a determination that the stored still image data is associated with moving image data that was previously connected with the still image data during a photography operation, controlling the display to playback both the still image data and the connected moving image data, and wherein the still image data was captured separately from the moving image data.

9. The apparatus of claim 8 further comprising:
c) an operation section for receiving user input to request playback of the stored still image data.

10. The apparatus of claim 8 wherein the moving image data includes at least one of a transition effect and a blurring transition effect.

11. The apparatus of claim 8 wherein a frame rate of the moving image data played back is lower than a normal frame rate.

12. A method for controlling playback, on a display, of image data stored in a recording section, the method comprising:
a) determining, from a stored mode state, whether or not the playback mode is of a first type or a second type; and
b) responsive to a determination that the playback mode is of the first type, controlling the display to playback still image data, and otherwise, responsive to a determination that the playback mode is of the second type, controlling the display to playback both still image data and moving image data, wherein the moving image data was previously connected with the still image data during a photography operation, and wherein the still image data was captured separately from the moving image data.

13. The method of claim 12 wherein the playback mode of the second type is an art mode.

14. The method of claim 12 further comprising:
c) receiving, via an operation section, user input,
wherein the mode state stored is based on the received user input.

15. The method of claim 12 wherein the moving image data includes at least one of a transition effect and a blurring transition effect.

16. The method of claim 12 wherein a frame rate of the moving image data played back is lower than a normal frame rate.

17. A method for controlling playback, on a display, of image data stored in a recording section, the method comprising:
a) determining whether or not the stored still image data has connected moving image data; and
b) responsive to a determination that the stored still image data does not have connected moving image data, controlling the display to playback the still image data, and otherwise, responsive to a determination that the stored still image data is associated with moving image data that was previously connected with the still image data during a photography operation, controlling the display to playback both the still image data and the connected moving image data, and wherein the still image data was captured separately from the moving image data.

18. The method of claim 17 further comprising:
c) receiving user input, via an operation section, to request playback of the stored still image data.

19. The method of claim 17 wherein the moving image data includes at least one of a transition effect and a blurring transition effect.

20. The method of claim 17 wherein a frame rate of the moving image data played back is lower than a normal frame rate.

* * * * *